(12) United States Patent
Ohhashi

(10) Patent No.: US 11,428,527 B2
(45) Date of Patent: Aug. 30, 2022

(54) MONITORING METHOD, MONITORING SYSTEM, AND PROGRAM

(71) Applicant: NIKON-TRIMBLE CO., LTD., Tokyo (JP)

(72) Inventor: Tetsuya Ohhashi, Yokohama (JP)

(73) Assignee: NIKON-TRIMBLE CO., LTD., Tokyo (JP)

( * ) Notice: Subject to any disclaimer, the term of this patent is extended or adjusted under 35 U.S.C. 154(b) by 0 days.

(21) Appl. No.: 16/319,598

(22) PCT Filed: Jul. 29, 2016

(86) PCT No.: PCT/JP2016/072453
§ 371 (c)(1),
(2) Date: Jan. 22, 2019

(87) PCT Pub. No.: WO2018/020691
PCT Pub. Date: Jan. 2, 2018

(65) Prior Publication Data
US 2020/0326187 A1 Oct. 15, 2020

(51) Int. Cl.
*G01C 11/06* (2006.01)
*B64C 39/02* (2006.01)
(Continued)

(52) U.S. Cl.
CPC ............ *G01C 11/06* (2013.01); *B64C 39/024* (2013.01); *B64D 47/08* (2013.01); *G01C 15/002* (2013.01);
(Continued)

(58) Field of Classification Search
CPC ............ G06T 7/20; G06T 2207/10032; G06T 2207/30181; B64C 39/024;
(Continued)

(56) References Cited

U.S. PATENT DOCUMENTS 6,530,284 B1 *  3/2003  Tambo ............... G08B 21/10
                                                    73/784
10,334,210 B2 *  6/2019  Davidson, Jr ........ G06T 3/4038
(Continued)

FOREIGN PATENT DOCUMENTS

CN    105644788 A    6/2016
CN    105783878 A    7/2016
(Continued)

OTHER PUBLICATIONS

Lindner et al. "UAV monitoring and documentation of a large landslide." Applied Geomatics 8.1 (2015): 1-11. (Year: 2015).*
(Continued)

*Primary Examiner* — Katrina R Fujita
(74) *Attorney, Agent, or Firm* — Brandon V. Zuniga; James R. Gourley; Carstens & Cahoon, LLP

(57) ABSTRACT

Disclosed is a monitoring method wherein: a target is prepared using terrain model data including terrain location information; at a first time, an image of the target is picked up by means of an image pickup unit of a surveying device, and first image data is generated; at a second time after the first time, an image of the target is picked by means of the image pickup unit of the surveying device, and second image data is generated; and displacement of the target is detected using a first image based on the first image data, and a second image based on the second image data.

19 Claims, 20 Drawing Sheets

(51) Int. Cl.
  *B64D 47/08* (2006.01)
  *G01C 15/00* (2006.01)
  *G01C 15/04* (2006.01)
  *G01S 19/01* (2010.01)
  *G06T 7/20* (2017.01)

(52) U.S. Cl.
  CPC .............. *G01C 15/04* (2013.01); *G01S 19/01* (2013.01); *G06T 7/20* (2013.01); *B64C 2201/027* (2013.01); *B64C 2201/14* (2013.01); *G06T 2207/10032* (2013.01); *G06T 2207/30181* (2013.01)

(58) Field of Classification Search
  CPC .......... B64C 2201/027; B64C 2201/14; B64D 47/08; G01C 11/06; G01C 15/002; G01C 15/04; G01S 19/01
  See application file for complete search history.

(56) References Cited

U.S. PATENT DOCUMENTS

| | | | |
|---|---|---|---|
| 10,403,037 B1* | 9/2019 | Boardman | G06T 7/60 |
| 2012/0183205 A1* | 7/2012 | Shimamura | G06T 7/246 |
| | | | 382/154 |
| 2015/0111601 A1* | 4/2015 | Fagan | H04W 4/027 |
| | | | 455/456.1 |
| 2015/0294233 A1* | 10/2015 | Aultman | G06N 20/00 |
| | | | 706/12 |
| 2015/0318015 A1* | 11/2015 | Bose | A63F 13/212 |
| | | | 386/248 |
| 2016/0082460 A1 | 3/2016 | McMaster et al. | |
| 2017/0259920 A1* | 9/2017 | Lai | B64D 47/08 |

FOREIGN PATENT DOCUMENTS

| | | | |
|---|---|---|---|
| EP | 2476999 A1 | 7/2012 | |
| JP | 2001-264059 A | 9/2001 | |
| JP | 2001-352537 A | 12/2001 | |
| JP | 2002-328021 A | 11/2002 | |
| JP | 2008-045890 A | 2/2008 | |
| JP | 2013-234946 A | 11/2013 | |
| JP | 5623226 B2 | 10/2014 | |

OTHER PUBLICATIONS

Abellán et al. "Detection and spatial prediction of rockfalls by means of terrestrial laser scanner monitoring." Geomorphology 119.3-4 (2010): 162-171. (Year: 2010).*
International Preliminary Report on Patentability for PCT Application PCT/JP2018/072453 dated Jan. 29, 2019 (5 pages).
Machine translation of JP 2001-352537A published on Dec. 21, 2001 (18 pages).
Machine translation of JP 2001-264059A published on Sep. 26, 2001 (14 pages).
Machine translation of JP 2013-234946A published on Nov. 21, 2013 (21 pages).
Machine translation of JP 2002-328021A published on Nov. 15, 2002 (14 pages).
Office Action for JP Application No. 2018-529344 dated Jun. 4, 2019 with partial machine translation (6 pages).
Hsiao, K.H., et al., "Change Detection of Landslide Terrains Using Ground-Based LIDAR Data," XXTH ISPRS Congress, vol. 7, No. 5, Jan. 1, 2004 (Jan. 1, 2004), XP055634578, Istanbul, Turkey (6 pages).
Machine translation of JP 2001-1352537A published on Dec. 21, 2001 (18 pages).
Machine translation of JP 2008-045890A published on Feb. 28, 2008 (14 pages).
Extended European Search Report for EP Application No. 16910594.7 (PCT/JP2016/072453) dated Feb. 13, 2020 (9 pages).
Office Action for CN Application No. 201680086179.4 dated Aug. 24, 2020, including English machine translation (12 pages).
Machine translation of CN 105783878(A) published on Jul. 20, 2016 (11 pages).
Machine translation of CN 105644788(A) published on Jun. 8, 2016 (5 pages).

* cited by examiner

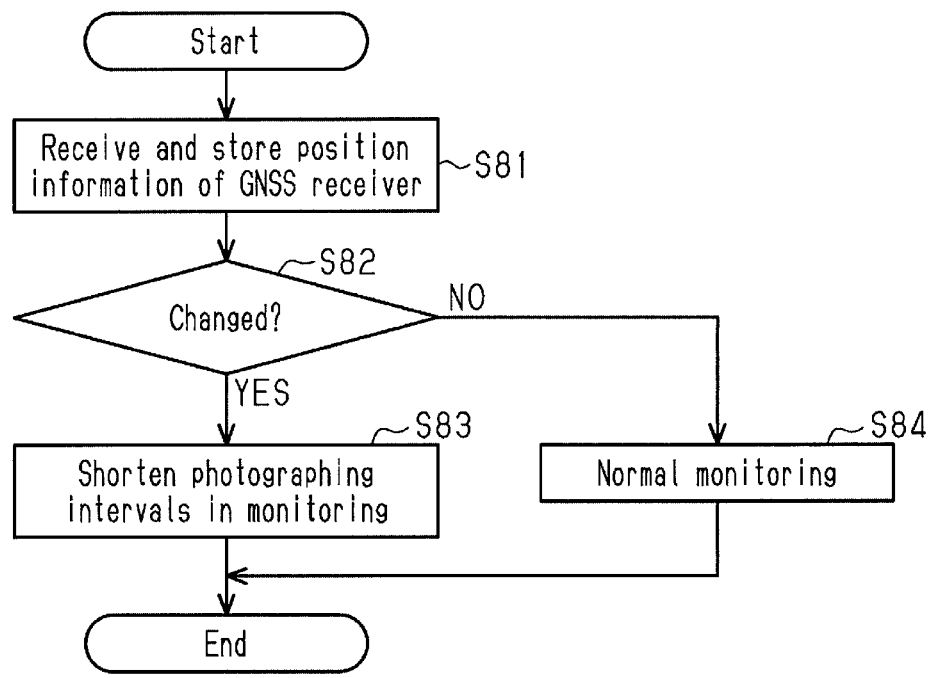

MONITORING METHOD, MONITORING SYSTEM, AND PROGRAM

TECHNICAL FIELD

The present invention relates to a monitoring method, a monitoring system, and a program.

BACKGROUND ART

Patent Document 1 describes an observation device that uses a survey instrument for monitoring displacement of a terrain or other features.

PRIOR ART DOCUMENT

Patent Document

Patent Document 1: Japanese Patent No. 5623226

SUMMARY OF THE INVENTION

In accordance with one aspect of the present invention, a monitoring method is provided. The method comprises preparing a target using terrain model data including position information of a terrain, generating first image data by photographing the target with a photographic portion of a survey instrument at a first time point, generating second image data by photographing the target with the photographic portion of the survey instrument at a second time point, which is subsequent to the first time point, and detecting displacement of the target using a first image, which is based on the first image data, and a second image, which is based on the second image data.

Another aspect of the present disclosure provides a monitoring system. The monitoring system comprises a controller, a flying object, and a survey instrument. The controller includes a setting portion configured to set a target position that is selected by an operator based on terrain model data including position information of a terrain, and a control portion configured to instruct the flying object to prepare a target at the target position, which is set by the setting portion. The flying object includes a holding portion configured to hold the target, and control portion configured to prepare the target, which is held by the holding portion, at the target position, which is instructed by the control portion of the controller. The survey instrument includes a photographic portion configured to generate image data by photographing the target, and a control portion configured to control the photographic portion to generate first image data by photographing the target, which is prepared at the target position, at a first time point and generate second image data by photographing the target at a second time point, which is subsequent to the first time point, and to send the first image data and the second image data to the controller. The controller is configured to detect displacement of the target between the first time point and the second time point using the first image data and the second image data sent from the survey instrument.

Another aspect of the present disclosure provides a program that causes a computer to execute steps of preparing a target using terrain model data including position information of a terrain, generating first image data by photographing the target with a photographic portion of a survey instrument at a first time point, generating second image data by photographing the target with the photographic portion of the survey instrument at a second time point, which is subsequent to the first time point, and detecting displacement of the target using a first image, which is based on the first image data, and a second image, which is based on the second image data.

BRIEF DESCRIPTION OF THE DRAWINGS

FIG. 32 is a flowchart showing the sequence of monitoring that is performed when displacement of a GNSS receiver is detected.

MODES FOR CARRYING OUT THE INVENTION

An observation system for observing terrain variation according to the present invention is now described.
[Overview]

Figure 1:
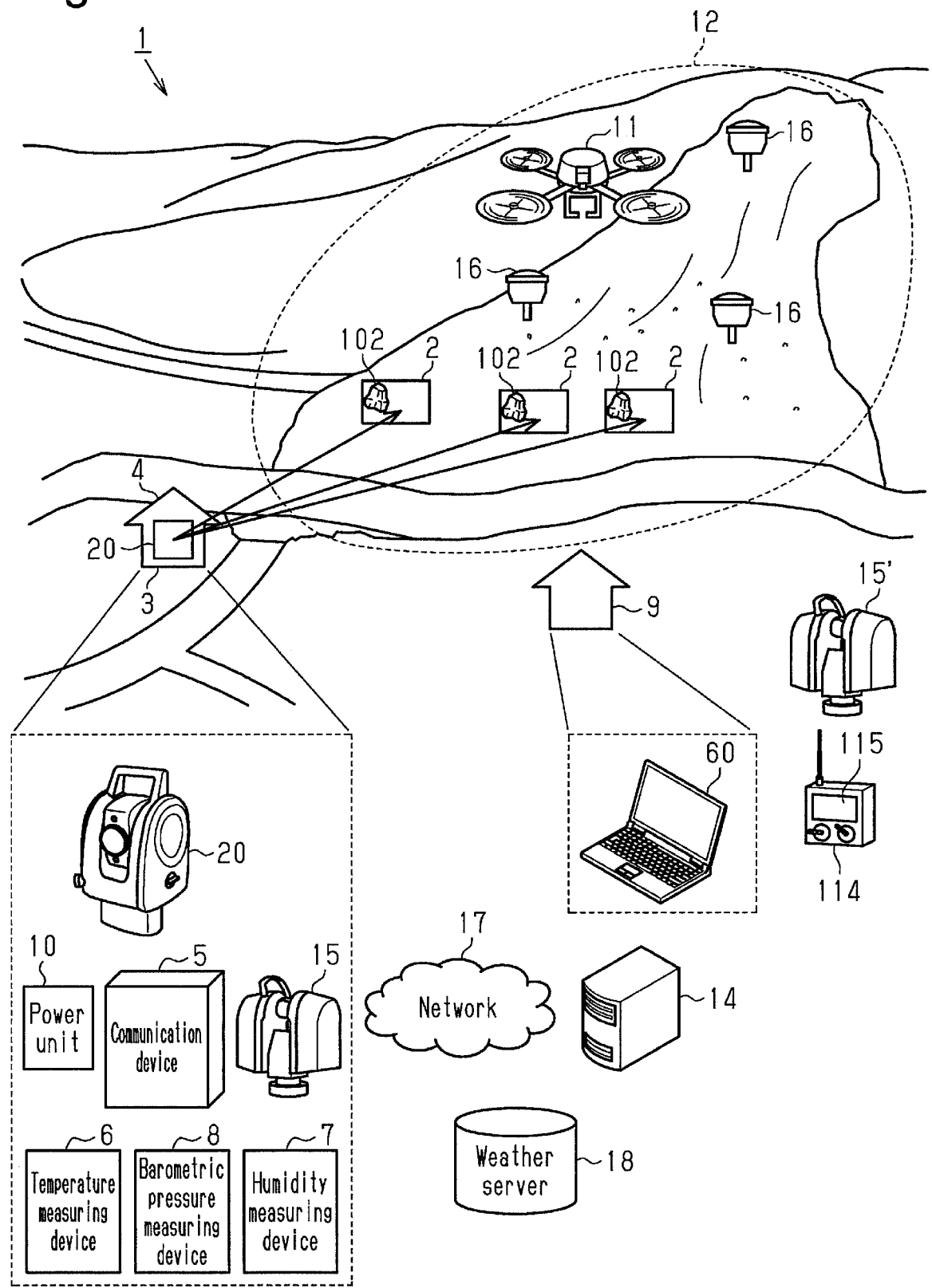
FIG. 1 is a diagram showing how an observation system is used to detect terrain displacement.

As shown in FIG. 1, an observation system 1 includes a survey instrument 20, which is a photographic device for photographing a terrain, which serves as an observation object, and an observation controller 60, which controls the survey instrument 20. In one example, the observation system 1 performs a fixed-point observation of an observation object 2 to detect displacement of the terrain of the observation object 2. The observation object 2 may be an area that is subjected to a high risk of terrain variation, such as a landslide, due to an earthquake, intense rainfall, or other conditions. For example, when restoration work is performed in a region where a landslide has occurred, an area inside or near the work site that is subjected to a high risk of terrain variation, such as a landslide, is set as an observation object 2 and monitored to detect any displacement of this observation object 2. The observation object 2 may include a single area or a plurality of areas. In one example, an observation object 2 may be an observation area including a region that is expected to be displaced, a region that is expected to cause damage when displaced, or a region that is used as a reference to identify any displacement of other locations. In one example, the observation object 2 may be an image area corresponding to the angle of view of the photographic device. In the example shown in FIG. 1, the leftmost observation object 2 in this figure is a region including a rock.

An observation object 2 that is subjected to a high risk of terrain variation and its surroundings cannot be easily accessed and studied by an operator. Thus, a survey instrument 20 may be used as a photographic device and installed at a photographing position 3, which is far from the observation object 2, to observe the observation object 2 from this photographing position 3. The photographing position 3 is set such that the survey instrument 20 installed at this position will not be engulfed by soil or other material, when a landslide occurs. In one example, the photographing position 3 is at a location that is unlikely to be affected when a landslide occurs in the observation object 2. To observe multiple observation objects 2, a single survey instrument 20 may be used to observe multiple observation objects 2, or each observation object 2 may be observed with a separate survey instrument 20. In one example, when multiple observation objects 2 are set, they are allocated among multiple survey instruments 20.

In one example, survey instruments 20 for observing terrain variations are set over a long period of time. Thus, each survey instrument 20 may be placed in a building such as an observation hut 4 so as to be protected from weather. In one example, a communication device 5 is installed in the observation hut 4 to remotely control the survey instrument 20. In one example, to obtain the observation conditions, external devices, such as a temperature measuring device 6, a humidity measuring device 7, and a barometric pressure measuring device 8, are also installed in the observation hut 4. Further, a power unit 10 may be installed in the observation hut 4 to supply power to the survey instrument 20 and other devices for a long duration, enabling long-term monitoring. The power unit 10 may receive power from an external source or include a generator or a battery, such as a rechargeable battery. The observation hut 4 may be a sectional building or a tent, for example.

The survey instrument 20 may be controlled by an observation controller 60, which is an observation device installed in a work hut 9, which is farther from the observation hut 4. The work hut 9 may be a sectional building or a tent, for example. The survey instrument 20 is connected to the observation controller 60 via a wired or wireless network 17. In one example, the survey instrument 20 is used to observe the observation object 2 periodically. In one example, the survey instrument 20 may photograph the observation object 2 at intervals of several minutes or hours to detect any terrain variation. The image data thus generated by photographing is stored in a storage device 14 or other storage connected via the network 17. The image data may be stored in other storage, such as a storage portion of the survey instrument 20 or a storage portion of the observation controller 60. The survey instrument 20 thus monitors the observation object 2.

In one example, when displacement in the observation object 2 is detected by a global navigation satellite system (GNSS), the survey instrument 20 shortens the observation intervals. For example, the survey instrument 20 changes the intervals from 5 minutes to 3 minutes or 1 minute. When no displacement is detected in the observation object 2, the observation intervals may be increased. For example, the intervals may be changed from 5 minutes to 10 minutes.

In one example, when multiple observation objects 2 are observed and displacement is detected in one or more of the observation objects 2, the survey instrument 20 gives priority to the observation objects 2 with displacement over the other observation objects 2. In one example, the observation object 2 in which displacement is detected is observed at shorter intervals than the observation objects 2 with no displacement. In one example, when displacement is detected in multiple observation objects 2, the survey instrument 20 observes these observation objects 2 in the order of amount of detected displacement, from largest to smallest.

In one example, when the position of a GNSS receiver 16 installed in the wide-area observation object 12 under observation is changed, the observation objects 2 are observed in the order closest to farthest from the displaced GNSS receiver 16.

The procedure before monitoring with the survey instrument 20 is summarized as follows. The observation system 1 first requires selection of an observation object 2 and then selection of a photographing position 3 at which a survey instrument 20 is installed. To this end, before starting monitoring, a flying object 11, such as a manned aircraft, an unmanned aerial vehicle (UAV) (drone), or a multicopter, is flown to photograph a wide-area observation object 12 to be observed using a camera or other device mounted on the flying object 11. Then, terrain model data may be generated from the obtained aerial photographs, and one or more observation objects 2 are selected from the wide-area observation object 12 using the terrain model data. After observation objects 2 are selected, a photographing position 3 at which a survey instrument 20 is installed is selected. Then, the survey instrument 20 is installed and set up at the photographing position 3. Accordingly, the survey instrument 20 is set in coordinates, such as global coordinates or local coordinates.

The wide-area observation object 12 may be scanned with a three-dimensional measurement device 15, and an observation object 2 and a photographing position 3 for a survey instrument 20 may be selected based on the terrain model data stored in the storage device 14. The three-dimensional measurement device 15 may be installed in the observation hut 4 or other location.

In one example, the wide-area observation object 12 is divided into a plurality of areas, and division terrain model data is obtained for each area. Terrain model data is generated by merging the data pieces of the areas. For example, a three-dimensional measurement device 15 installed at a first position measures a first division area in the wide-area observation object 12 to generate first division terrain model data. After generating the first division terrain model data, the three-dimensional measurement device 15 may be moved from the first position to a second position. At the second position, the three-dimensional measurement device 15 measures a second division area in the wide-area observation object 12 to generate second division terrain model data. When generating the second division terrain model data, the three-dimensional measurement device 15 at the second position measures the second division area so as to include at least two of the points that have been measured by the three-dimensional measurement device 15 to generate the first division terrain model data. The first division terrain model data and the second division terrain model data, which are generated separately, are merged to form the terrain model data of the wide-area observation object 12. This example uses a single three-dimensional measurement device 15 to generate multiple division terrain model data pieces, but multiple three-dimensional measurement devices 15 may be used to generate multiple division terrain model data pieces. For example, a three-dimensional measurement device 15 may be placed at the first position to generate first division terrain model data, and another three-dimensional measurement device 15' may be placed at the second position to generate second division terrain model data. The three-dimensional measurement devices 15 and 15' may be collectively referred to as a three-dimensional measurement device 15.

Then, the observation object 2 is observed and photographed with the survey instrument 20, which has been set up, and the image data of the observation image including a characteristic region, which is used to detect terrain displacement, is stored in storage, such as the storage device 14, the storage portion of the observation controller 60, or the storage portion of the survey instrument 20. This observation includes measurement of the distance with a distance measuring portion 33 of the survey instrument 20 and measurement of angles with a horizontal-angle measuring portion 51 and a vertical-angle measuring portion 52. The image data is stored together with the distance measurement data measured by the distance measuring portion 33, the angle measurement data measured by the horizontal-angle measuring portion 51 and the vertical-angle measuring portion 52, and position information (e.g., coordinate data) of a target 102 in storage, such as the storage device 14, the storage portion of the observation controller 60, or the storage portion of the survey instrument 20.

The characteristic region is an area in an observation image that includes a distinctive target 102 in the observation object 2. The target 102 may be a distinctive natural object. The distinctive natural object may be a rock, as described above, or a tree, such as a large tree, that is present in the observation object 2. In one example, the target 102 is an artificial item formed using a flying object 11 that is flown to the observation object 2. For example, the target 102 may be a region to which observation paint is applied, or an observation target. The characteristic region corresponding to the target 102 may be set by these types of means that do not require an operator actually going to the observation site. The characteristic region allows the observation controller 60 to detect displacement of the characteristic region by photographing the observation object 2 with the survey instrument 20. Displacement of the characteristic region is thus detected during monitoring. That is, in the observation system 1, the image data, which is generated by photographing with the survey instrument 20, and the position information of the target 102 are sent to the observation controller 60, which detects displacement based on the image data and the position information. In addition to monitoring at fixed time, the observation object 2 may be photographed at any given time by an operator who is at the photographing position 3 or by remote control with the observation controller 60.

In one example, observation may be performed at fixed time during a period after the start of monitoring in which no displacement is detected. In one example, the photographing intervals of the survey instrument 20 may be changed when displacement is detected. Monitoring with slight variations in the photographing intervals, such as when a fixed photographing interval of 5 minutes becomes 4 minutes and 59 seconds or 5 minutes and 1 second, is still considered as monitoring at fixed time.

To monitor the observation object 2, the observation controller 60 sights the survey instrument 20 on the representative position, photographs the observation object 2 including the characteristic region, and stores the image data generated by photographing in the storage device 14 or other storage. The observation controller 60 compares the characteristic region set in the reference observation image with the comparative image, which corresponds to the characteristic region, in the comparative observation image captured during monitoring and detects displacement in the comparative image with respect to the reference image.

In the monitoring as described above, the observation controller 60 generates warning data when detecting displacement of the characteristic region. In one example, the observation controller 60 sends e-mail to operators who are registered in the e-mail system to notify them about the displacement. The notification is not limited to e-mail, and the operators may be notified by any text-based communication. Other means of notifying operators or others include notification using an outdoor speaker of a municipal disaster prevention radio, for example, or an electric bulletin board. In one example, post-sharing services, such as an electronic bulletin board system and a social networking service (SNS), may be used to notify operators and others. In one example, light, such as warning light, may be used for notification. In one example, when the positions of operators can be identified with a GNSS or the like, the observation controller 60 sends notification only to the operators who are identified to be near the characteristic region where the displacement is detected, but not to the operators who are identified to be far from the displaced characteristic region. Alternatively, all the operators may be notified.

The observation controller 60 is capable of searching for the observation image captured at a specific time, or the observation image of a specific observation object 2. In one example, when a photographed image of a specific image area is used as a search key, the observation controller 60 displays the characteristic regions photographed at different time points on the display portion. When the image of a characteristic region is selected, a plurality of characteristic regions is displayed in one observation image so that the progress of displacement of the characteristic region is recognized.

The observation system 1 may be connected to a GNSS. For example, the survey instrument 20 includes a GNSS reception portion 58, and the survey instrument 20 obtains time information from the GNSS when photographing. Thus, in monitoring, the survey instrument 20 photographs the observation object 2 at time points in accordance with the GNSS, thereby photographing the observation object 2 at more accurate time points. In one example, the survey instrument 20 or the observation controller 60 obtains time information from a network time protocol (NTP) server, which is an external device.

Further, a GNSS receiver 16, which serves as an external device, may be installed in the wide-area observation object 12. The GNSS receiver 16 compares the signals transmitted from different artificial satellites and calculates the time difference between when the radio waves are received in order to determine the position information of the GNSS receiver 16. When multiple GNSS receivers 16 are installed at different locations away from an observation object 2, displacement of these locations can be detected with the GNSS receivers 16. When displacement of a GNSS receiver 16 is detected, the time intervals for the observation using the survey instrument 20 may be shortened, allowing for more precise observation of the time point at which displacement starts in the observation object 2 and the state during the displacement. In one example, when the position of a GNSS receiver 16 is changed, the observation objects 2 are observed in the order closest to farthest from the GNSS receiver 16 with which displacement is detected.

The power of the survey instrument 20 may be controlled to be turned on only during a specific time period including photographing time points and turned off other than this time period so as to save power consumption. The power of the survey instrument 20 may be turned on during the day (daytime) and turned off at night to save power consumption. Displacement in the observation object 2 is detectable from image data obtained during the day, but it is impossible or difficult to detect displacement in the observation object 2 from image data obtained at night.

In the observation system 1, the observation controller 60 may store in the storage device 14 the observation conditions under which the observation object 2 is photographed in relation to the image data of the observation image. The observation conditions may include temperature data obtained by the temperature measuring device 6 in the observation hut 4, humidity data obtained by the humidity measuring device 7, and barometric data obtained by the barometric pressure measuring device 8. In addition, the observation conditions may include the photographing conditions and the brightness of the photographic portion of the survey instrument 20. When the observation object 2 is photographed during monitoring, for example, the observation conditions under which the observation object 2 is photographed are thus stored in the storage device 14 or other storage.

In one example, the observation controller 60 obtains weather information of an area including the observation object 2 when the observation object 2 is photographed. Such weather information may be obtained from a weather server 18, which is an external device, via the network 17 such as the Internet. During monitoring, the information on the weather at the time of photographing the observation object 2 is thus stored in the storage device 14 or other storage.

Figure 2:
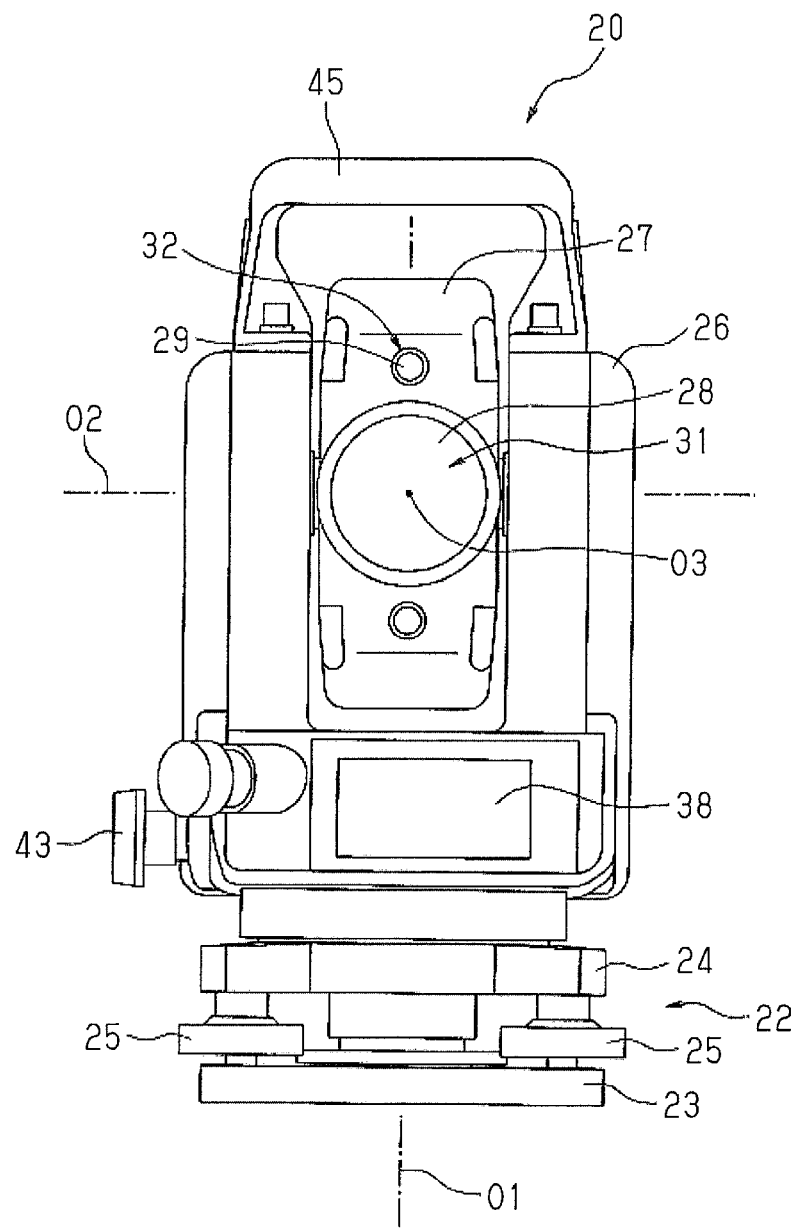
FIG. 2 is a front view of a survey instrument.

[Structure of Survey instrument] As shown in FIG. 2, the survey instrument 20 includes a leveling portion 22, a main body 26, and a photographic portion 27. The leveling portion 22 may be a tribrach. The leveling portion 22 includes a base plate 23, an upper plate 24, and a leveling screw 25. The base plate 23 is to be fixed to a tripod. The base plate 23 may be fixed to the upper end of tripod legs with screws or other fastener. The inclination of the upper plate 24 relative to the base plate 23 is adjustable with the leveling screw 25. The upper plate 24 is coupled to the main body 26. The inclination of the vertical axis O1 of the survey instrument 20, which serves as a first axis, is adjustable with the leveling screw 25.

Leveling refers to aligning the vertical axis of the survey instrument 20 with the vertical direction. The vertical axis O1 of the leveled survey instrument 20 extends in the vertical direction. When the survey instrument 20 is leveled, the vertical axis O1 extends in the vertical direction, and the horizontal axis O2 of the survey instrument 20, which serves as a second axis, is at right angles with the vertical axis O1.

Centering refers to aligning the center vertical line of the survey instrument 20 with the center of a second target (survey marker). Centering refers to aligning the mechanical center of the survey instrument 20 with the vertical line passing through the measurement point, such as a survey reference position (reference point) on the ground. The vertical axis O1 of the centered survey instrument 20 extends through the center of the second target. The second target may be a target for instrument height measurement or a survey tack.

Figure 3:
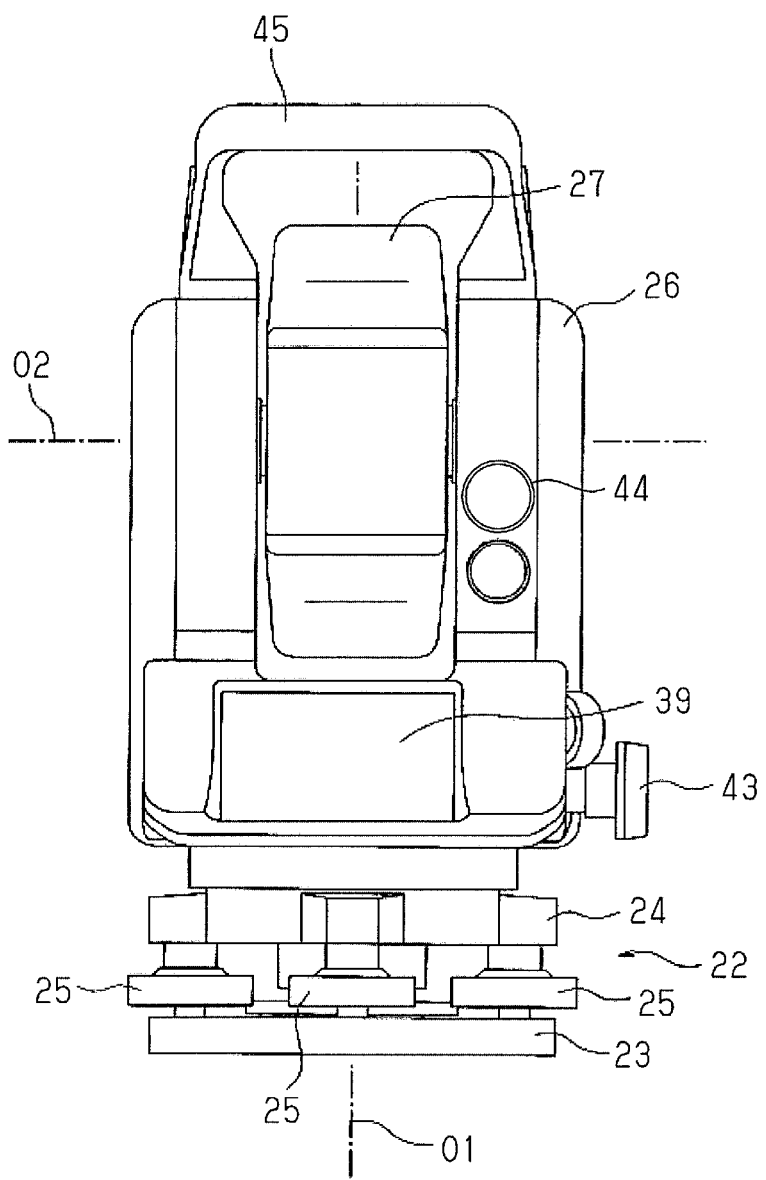
FIG. 3 is a rear view of the survey instrument.

As shown in FIGS. 2 and 3, the main body 26 is supported by the leveling portion 22 so as to be rotatable about the vertical axis. The main body 26 is thus rotatable about the vertical axis relative to the leveling portion 22. The main body 26 is positioned above the leveling portion 22. The photographic portion 27 is supported by the main body 26 so as to be rotatable about the horizontal axis. The main body 26 functions as a support column and a bracket. The main body 26 has a first display portion 38, a second display portion 39, a horizontal-angle operation portion 43, a vertical-angle operation portion 44, a grip portion 45, and a third photographic portion 34 (see FIG. 4).

The first display portion 38 and the second display portion 39 have a display function of displaying images and objects. In one example, each of the first and second display portions 38 and 39 displays on its screen the images that are based on the image data generated by the photographic portion 27 and the information that is based on the observation data. In one example, the first and second display portions 38 and 39 may be liquid crystal displays or organic EL displays. In one example, the first display portion 38 is on the reverse side. In one example, the first display portion 38 is used for reverse observation. The second display portion 39 is on the direct side. In one example, the second display portion 39 is used for direct observation. In one example, the first and second display portions 38 and 39 each function as an operation portion operated by the user. In this case, the first and second display portions 38 and 39 may be capacitive touch panels or pressure-sensitive touch panels. In one example, the first display portion 38 is rotatable about the horizontal axis or the vertical axis. In one example, the second display portion 39 is rotatable about the horizontal axis or the vertical axis. In one example, the second display portion 39 has a tilt function and is tilted at different angles in the vertical direction.

The horizontal-angle operation portion 43 is operated by the user to rotate the main body 26 about the vertical axis O1. When the user operates the horizontal-angle operation portion 43, the main body 26 and the photographic portion 27 are both rotated about the vertical axis O1. The vertical-angle operation portion 44 is operated by the user to rotate the photographic portion 27 about the horizontal axis O2. The horizontal-angle operation portion 43 and the vertical-angle operation portion 44 may be knobs. The grip portion 45 is held by the user to carry the survey instrument 20, for example. The grip portion 45 may be a carrying handle. The grip portion 45 is fixed to the upper surface of the main body 26, for example.

Figure 4:
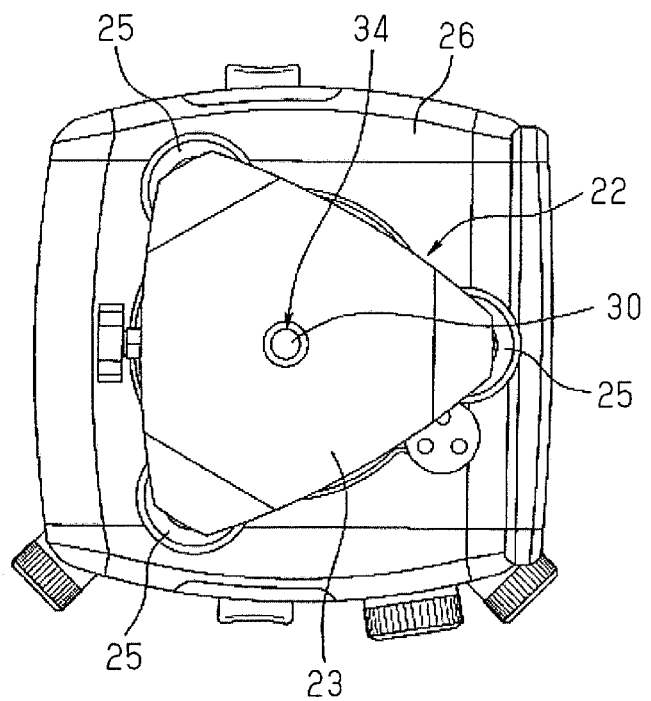
FIG. 4 is a bottom view of the survey instrument.

As shown in FIG. 4, the third photographic portion 34 includes a third optical system, which includes a third objective lens 30, and a third photographic element. The third optical system guides light from the second target to the third photographic element. The third photographic element photographs the second target to generate image data. The third photographic portion 34 photographs the area below the survey instrument 20 to generate image data. The third photographic portion 34 photographs the lower area including the vertical axis O1 to generate image data. The third photographic element may be a CCD or a CMOS. The image data generated by the third photographic portion 34 is output to an image processing portion 53. In one example, the third photographic portion 34 generates image data that is used to display the image of the area below the survey instrument 20 on the first and second display portions 38 and 39 when the user levels and centers the survey instrument 20. The third photographic portion 34 is fixed to the main body 26. In one example, the third photographic portion 34 is a centering camera. In one example, the third photographic portion 34 is a centering telescope.

The photographic portion 27 is supported by the main body 26 so as to be rotatable about the horizontal axis. The photographic portion 27 is rotatable about the horizontal axis O2. The photographic portion 27 is rotatable about the vertical axis O1 relative to the leveling portion 22. The photographic portion 27 is rotatable about the vertical axis O1 and the horizontal axis O2. The photographic portion 27 rotates in the horizontal direction according to the degree the user operates the horizontal-angle operation portion 43. The photographic portion 27 rotates in the vertical direction according to the degree the vertical-angle operation portion 44 is operated by the user.

The photographic portion 27 includes a first photographic portion 31 and a second photographic portion 32. Each of the first and second photographic portions 31 and 32 may be a CCD or a CMOS. The image data generated by the first and second photographic portions 31 and 32 is output to the image processing portion 53. For sighting, the first and second photographic portions 31 and 32 generate image data to display an image including the first target in the visual field on the first and second display portions 38 and 39. In a prism method, the first and second photographic portions 31 and 32 photograph the first target, which is a survey object. In a non-prism method, the first and second photographic portions 31 and 32 measure the measurement surface of an observation object 2, for example. The visual field captured with the first and second photographic portions 31 and 32 differs from the visual field captured with the third photographic portion 34 and does not overlap with the visual field captured with the third photographic portion 34.

The first photographic portion 31 includes a first optical system, which includes a first objective lens 28, and a first photographic element. The first optical system guides the light in the view field (including the light from the first target, for example) to the first photographic element. The first photographic portion 31 may be a telescope camera. In one example, the first photographic portion 31 is a sighting camera. In one example, the first photographic portion 31 is a sighting telescope. In one example, the first photographic portion 31 has a first angle of view. In one example, the first photographic portion 31 has a first field of view.

The second photographic portion 32 includes a second optical system, which includes a second objective lens 29, and a second photographic element. The second optical system guides the light in the view field (including the light from the first target, for example) to the second photographic element. The second objective lens 29 is provided separately from the first objective lens 28. In one example, the second objective lens 29 is placed in the same plane as the first objective lens 28 in the photographic portion 27. In one example, the second objective lens 29 is placed in line with the first objective lens 28 in the vertical direction. In one example, the optical axis of the second objective lens 29 is parallel to the optical axis of the first objective lens 28. The second photographic portion 32 has a second angle of view, which is wider than the first angle of view of the first photographic portion 31. The first angle of view of the first photographic portion 31 is narrower than the second angle of view of the second photographic portion 32. The second photographic portion 32 has a second viewing angle, which is wider than the first viewing angle of the first photographic portion 31. The first viewing angle of the first photographic portion 31 is narrower than the second viewing angle of the second photographic portion 32. For sighting, the second photographic portion 32 may generate image data to display an image that includes the first target and has the second field of view, which is wider than the first field of view, on the first and second display portions 38 and 39. In one example, the second photographic portion 32 is a wide-angle camera. In one example, the second photographic portion 32 is a wide-angle telescope.

Sighting refers to aiming the objective lens at the target and aligning the collimation axis with the center of the target. The collimation axis passes through the optical center of the objective lens and intersects with the horizontal axis at right angles (90°). The collimation axis passes through the optical center of the first objective lens 28 of the first photographic portion 31 and intersects with the horizontal axis O2 at right angles (90°). The collimation axis passes through the center of the objective lens of the theodolite and is orthogonal to the horizontal axis. The collimation axis coincides with the optical axis of the first objective lens 28. When the survey instrument 20 is sighted, the first objective lens 28 faces the first target, and the collimation axis O3, which is the third axis of the survey instrument 20, is aligned with the center of the first target. The direction from the inside to the outside of the survey instrument 20 along the collimation axis may be referred to as the sighting direction.

[System Structure of Survey Instrument]

Figure 5:
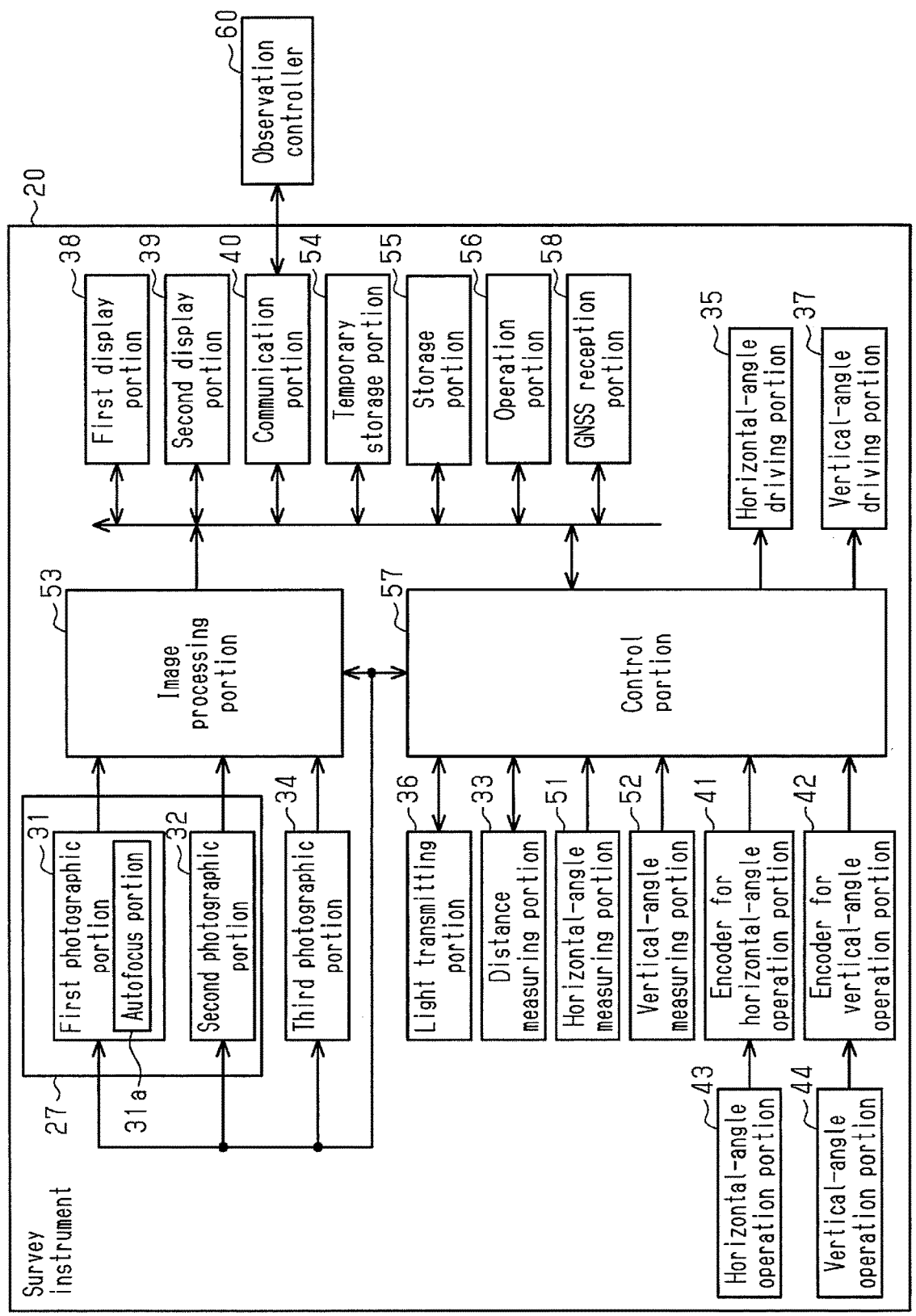
FIG. 5 is a block diagram showing the system structure of the survey instrument.

FIG. 5 is a block diagram showing the system structure of the survey instrument 20.

The survey instrument 20 has a photographic portion 27, which includes first and second photographic portions 31 and 32, and a third photographic portion 34. The survey instrument 20 also includes a distance measuring portion 33, a horizontal-angle driving portion 35, a light transmitting portion 36, a vertical-angle driving portion 37, a first display portion 38, a second display portion 39, a communication portion 40, an encoder for horizontal-angle operation portion 41, an encoder for vertical-angle operation portion 42, a horizontal-angle operation portion 43, a vertical-angle operation portion 44, a horizontal-angle measuring portion 51, a vertical-angle measuring portion 52, an image processing portion 53, a temporary storage portion 54, a storage portion 55, an operation portion 56, a control portion 57, and a GNSS reception portion 58.

The first and second photographic portions 31 and 32 capture images according to the photographing conditions (e.g., gain and accumulation time (shutter speed)) set by the control portion 57 to generate first image data and second image data, which are output to the image processing portion 53. The suitable exposure is automatically set by the control portion 57 for the first and second photographic portions 31 and 32 so that the images based on the image data generated by photographing have adequate brightness. The control portion 57 has an automatic exposure function for the first and second photographic portions 31 and 32. The first optical system in the first photographic portion 31 is configured such that the focus lens driving portion can change the position of the focus lens along the optical axis according to a focus adjustment command from the control portion 57. The third photographic portion 34 captures images according to the photographing conditions (e.g., gain and accumulation time (shutter speed)) set by the control portion 57 to generate third image data, which is output to the image processing portion 53. The first photographic portion 31 includes an autofocus portion 31a.

The image processing portion 53 performs image processing on the image data output from the first, second, and third photographic portions 31, 32 and 34. The image data processed by the image processing portion 53 is stored in the temporary storage portion 54. For example, in the live view mode, when the first, second, and third photographic portions 31, 32 and 34 capture images sequentially, the temporary storage portion 54 sequentially stores the image data pieces that are output.

The temporary storage portion 54 temporarily stores the image data. In one example, the temporary storage portion 54 is volatile memory. In one example, the temporary storage portion 54 is random access memory (RAM).

The image processing portion 53 performs image processing including a process of generating image data for display, a process of generating compressed image data, a process of generating image data for recording, and a process of extracting a part from an image based on the image data and electronically magnifying the part (digital zooming). The control portion 57 displays the image data for display, which is generated by the image processing portion 53, on the first and second display portions 38 and 39.

The survey instrument 20 may include an ocular optical system for sighting and an ocular optical system for centering.

The image data for recording, which is generated by the image processing portion 53, is stored in external memory via the communication portion 40. In one example, the external memory is nonvolatile memory. In one example, the external memory is flash memory, a hard disk, or an optical disk.

The distance measuring portion 33 is a survey portion, which may be an electro-optical distance measuring instrument including a light emitting element, a dichroic mirror, and a light receiving element. In one example, the light emitting element is a laser diode, such as a pulsed laser diode (PLD), or a light emitting diode, such as an infrared light emitting diode. In one example, the distance measuring light emitted from the light emitting element is converted by the dichroic mirror into a light beam coaxial with the first objective lens 28. The distance measuring portion 33 directs this light beam to the first target (e.g., a reflective prism or the measurement surface of a structure), which serves as the survey object. The light reflected by the survey object returns to the first objective lens 28, is separated from the distance measuring light by the dichroic prism, and is then incident on the light receiving element. The distance to the survey object is calculated from the time difference between when the reference light from the light emitting element is incident on the light receiving element in the distance measuring portion 33 and when the distance measuring light reflected from the survey object is incident on the light receiving element. The distance measuring portion 33 may be a phase-shift distance measuring system, which calculates the distance to the survey object based on the phase shift.

The light transmitting portion 36 transmits light to the first target to irradiate the first target. In one example, the light transmitting portion 36 is a light emitting diode of the distance measuring portion 33. In one example, the light transmitting portion 36 and the distance measuring portion 33 share a common light emitting diode. The light transmitting portion 36 transmits a light beam coaxial with the first objective lens 28 toward the first target. In one example, the light transmitting portion 36 is a light emitting diode that is provided separately from the distance measuring portion 33.

The horizontal-angle measuring portion 51 detects the rotation angle of the collimation axis O3 in the horizontal direction (the angle about the vertical axis O1) and outputs a signal corresponding to the detected rotation angle to the control portion 57. In one example, the horizontal-angle measuring portion 51 is an encoder. In one example, the horizontal-angle measuring portion 51 is an absolute optical rotary encoder. The horizontal-angle measuring portion 51 is an angle detection portion that detects the horizontal angle.

The vertical-angle measuring portion 52 detects the rotation angle of the collimation axis O3 in the vertical direction (the up-down direction) (the angle about the horizontal axis O2). The vertical-angle measuring portion 52 outputs a detection signal corresponding to the detected angle to the control portion 57. In one example, the vertical-angle measuring portion 52 is an encoder. In one example, the vertical-angle measuring portion 52 is an absolute optical rotary encoder. The vertical-angle measuring portion 52 is an angle detection portion that detects the vertical angle.

The encoder for horizontal-angle operation portion 41 detects the rotation angle of the horizontal-angle operation portion 43 and outputs a signal corresponding to the detected rotation angle to the control portion 57.

The horizontal-angle driving portion 35 rotates the main body 26 about the vertical axis O1 relative to the leveling portion 22. The horizontal-angle driving portion 35 rotates the main body 26 about the vertical axis O1 relative to the leveling portion 22, so that the photographic portion 27 rotates about the vertical axis O1 relative to the leveling portion 22. In one example, the horizontal-angle driving portion 35 is a motor.

In one example, the horizontal-angle driving portion 35 rotates the main body 26 about the vertical axis O1 relative to the leveling portion 22 according to the driving amount calculated by the control portion 57 based on the position in the touch panel of the first display portion 38 or the second display portion 39 that is touched by the user.

In one example, when receiving a rotation command from an external device, such as the observation controller 60, the horizontal-angle driving portion 35 rotates the main body 26 about the vertical axis O1 relative to the leveling portion 22 according to the driving amount calculated by the control portion 57 based on the rotation command from the external device.

In one example, when the horizontal-angle operation portion 43 is operated, the horizontal-angle driving portion 35 rotates the main body 26 about the vertical axis O1 of the survey instrument 20 relative to the leveling portion 22.

The encoder for vertical-angle operation portion 42 detects the rotation angle of the vertical-angle operation portion 44 and outputs a signal corresponding to the detected rotation angle to the control portion 57.

The vertical-angle driving portion 37 rotates the photographic portion 27 about the horizontal axis O2 relative to the main body 26. The vertical-angle driving portion 37 may be a motor.

In one example, the vertical-angle driving portion 37 rotates the photographic portion 27 about the horizontal axis O2 relative to the main body 26 according to the driving amount calculated by the control portion 57 based on the position in the touch panel of the first display portion 38 or the second display portion 39 that is touched by the user.

In one example, when receiving a rotation command from an external device, the vertical-angle driving portion 37 rotates the photographic portion 27 about the horizontal axis O2 relative to the main body 26 according to the driving amount calculated by the control portion 57 based on the rotation command from the external device.

In one example, when the vertical-angle operation portion 44 is operated, the vertical-angle driving portion 37 rotates the photographic portion 27 about the horizontal axis O2 relative to the main body 26.

The communication portion 40 communicates with the observation controller 60, which is an external device. The communication portion 40 is an interface for inputting and outputting data to and from external devices. For example, the communication portion 40 may be a communication interface of the ActiveSync standard, a communication interface of the universal serial bus (USB) standard, a wireless communication interface of the Bluetooth (registered trademark) standard, or a communication interface of the RS-232C serial communication standard. The communication portion 40 sends to the observation controller 60 the image data of an observation object 2 photographed with the survey instrument 20 and the representative position information. The communication portion 40 also receives a command signal that is sent from the observation controller 60 to control the survey instrument 20.

The storage portion 55 stores programs, parameters, and the like required to operate the survey instrument 20. The storage portion 55 stores programs and parameters such that they are not deleted while the survey instrument 20 is not operating. The storage portion 55 may be nonvolatile memory or a hard disk. In one example, the storage portion 55 is read-only memory (ROM). In one example, the storage portion 55 stores the image data of the image captured with the survey instrument 20. In one example, the storage portion 55 stores the terrain model data of a wide-area observation object 12.

The operation portion 56 may be a mechanical operation member, such as a push button, a volume switch, and a slide switch arranged on the housing. In one example, the operation portion 56 is a touch panel arranged in the screen of the first display portion 38 or the second display portion 39. When operated by the user, a mechanical operation member outputs to the control portion 57 a command signal for performing the function associated with the operation member. When an object displayed on the touch panel is touched, the touch panel outputs to the control portion 57 a command signal for performing the function associated with the object.

The control portion 57 controls the overall operation of the survey instrument 20.

In one example, the control portion 57 rotates the main body 26 about the vertical axis O1 relative to the leveling portion 22 in response to a command signal from the operation portion 56 or an external device. In one example, the control portion 57 rotates the main body 26 about the vertical axis O1 relative to the leveling portion 22 when the user operates the horizontal-angle operation portion 43. In one example, the control portion 57 rotates the photographic portion 27 about the horizontal axis O2 relative to the main body 26 in response to a command from the operation portion 56 or an external device. In one example, the control portion 57 rotates the photographic portion 27 about the horizontal axis O2 relative to the main body 26 when the user operates the vertical-angle operation portion 44.

In one example, the control portion 57 operates the first and second photographic portions 31 and 32 to photograph the observation object 2 based on the set photographing conditions in order to generate image data. The control portion 57 outputs this image data to the image processing portion 53.

In one example, when receiving a drive command signal from the observation controller 60, the control portion 57 drives the first photographic portion 31 (including the auto-focus portion 31a), the second photographic portion 32, the third photographic portion 34, the photographic portion 27, the horizontal-angle driving portion 35, and the vertical-angle driving portion 37 according to the command signal.

In one example, the control portion 57 outputs to the observation controller 60 the image data and the observation data generated by the photographic portion 27 from the communication portion 40.

In monitoring, the GNSS reception portion 58 allows the survey instrument 20 to photograph the observation object 2 at time points in accordance with the GNSS, thereby photographing the observation object 2 at more accurate time points. The GNSS reception portion 58 compares the signals transmitted from different artificial satellites and calculates the time difference between when the radio waves are received so as to obtain position information of the survey instrument 20.

[System Structure of Observation Controller]

Figure 6:
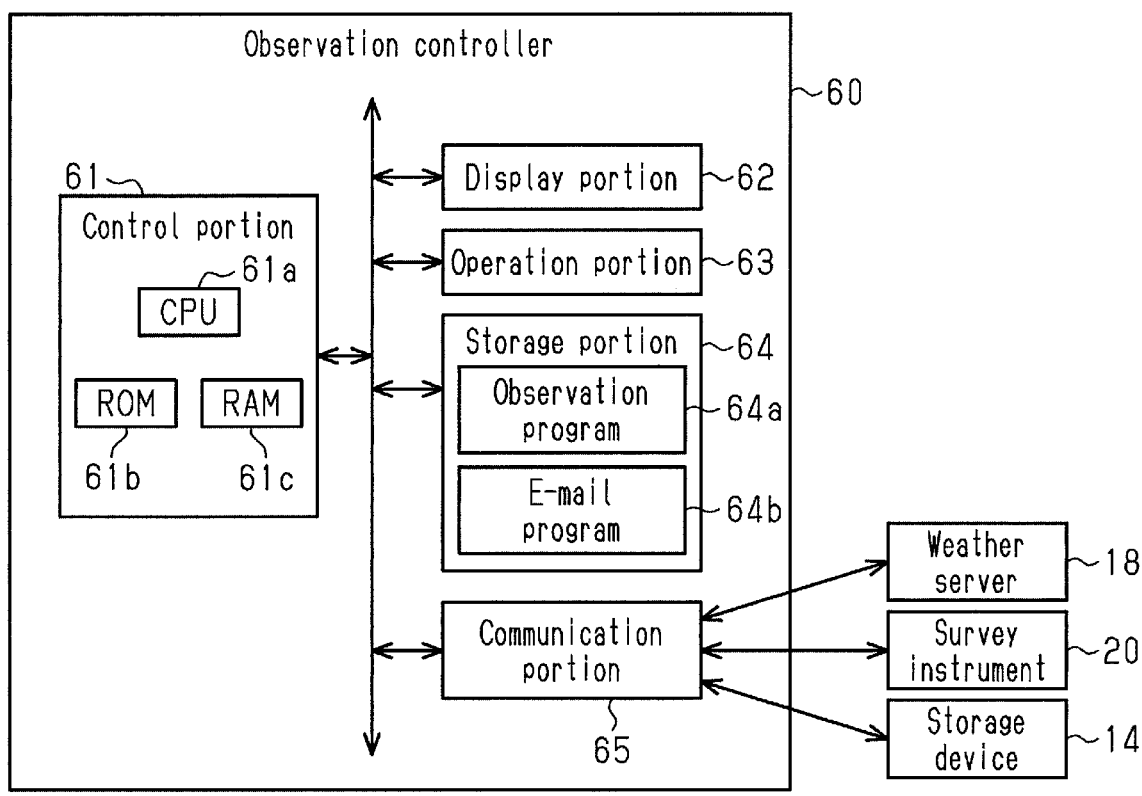
FIG. 6 is a block diagram of an observation controller.

FIG. 6 is a block diagram showing the system structure of the observation controller 60.

The observation controller 60 includes a control portion 61, a display portion 62, an operation portion 63, a storage portion 64, and a communication portion 65.

The control portion 61 has a configuration similar to that of a computer and includes a CPU 61*a*, ROM 61*b*, and RAM 61*c*, which are connected to one another via a bus. In one example, the control portion 61 executes an observation program 64*a*, which may be installed in a hard disk serving as the storage portion 64. The observation program 64*a* is a program for controlling the operation of the survey instrument 20 in order to monitor the image region. In one example, the control portion 61 functions as a display control portion that controls the display portion 62 to display images. The control portion 61 controls the display portion 62 to display images based on the image data generated by the photographic portion 27. In one example, the control portion 61 controls the display portion 62 to display the image of the observation object 2. In one example, the control portion 61 functions as a detection portion that compares the images of the observation object 2 that are photographed at different time points and detects displacement of the characteristic region in the observation object 2. In one example, the control portion 61 functions as a setting portion that sets an observation object 2 to be photographed with the photographic portion 27 and a photographing position 3 of a survey instrument 20 based on the terrain model data. In one example, when a target 102 is prepared in the observation object 2 that includes the target position for setting the target 102, the target position is set on the flight route of the flying object 11. Then, the control portion 61 sends a command signal to the flying object 11 to remotely operate the flying object 11. In one example, the control portion 61 outputs to the survey instrument 20 a command signal for driving the first photographic portion 31, the second photographic portion 32, the third photographic portion 34, the photographic portion 27, the horizontal-angle driving portion 35, and the vertical-angle driving portion 37, for example, via the communication portion 65.

The display portion 62 has a display function of displaying images and objects. The display portion 62 may be a liquid crystal display, an organic EL display, or a CRT. In one example, the display portion 62 displays on its screen the images based on the image data generated by the first and second photographic portions 31 and 32.

The operation portion 63 may be a keyboard, a mouse, or a touch panel arranged on the screen of the display portion 62. When an object on the display portion 62 is selected, the operation portion 63 outputs to the control portion 61 a command for performing the function associated with the object.

The storage portion 64 stores programs and parameters such that they are not deleted while the survey instrument 20 is not operating. In one example, the storage portion 64 may be nonvolatile memory or a hard disk. In one example, the storage portion 64 stores the observation program 64*a* and an e-mail program 64*b* for sending and receiving e-mail. In one example, the storage portion 64 stores the image data of the images of the observation object 2 that are captured following the observation program 64*a*. In one example, the storage portion 64 stores a program for remote control of the flying object 11.

The communication portion 65 communicates with the communication portion 40 of the survey instrument 20. In one example, the communication portion 65 receives the image data of the image captured with the survey instrument 20 and the position information, and outputs a command signal for controlling the survey instrument 20. In one example, the communication portion 65 communicates with an external device via the network 17, such as a wide area network or a local area network. In one example, the communication portion 65 communicates with a server unit, which is an external device. In one example, the communication portion 65 functions as a time obtainment portion and obtains from the survey instrument 20 the time information on the time points at which the observation object 2 is photographed. In one example, the communication portion 65 receives the time information from a GNSS receiver 16. In one example, the communication portion 65 receives from the GNSS receiver 16 the position information on the position where the GNSS receiver 16 is installed. In one example, the communication portion 65 functions as an observation condition obtainment portion and obtains the observation conditions including the temperature data obtained by the temperature measuring device 6 in the observation hut, the humidity data obtained by the humidity measuring device 7, and the barometric data obtained by the barometric pressure measuring device 8. In one example, the communication portion 65 functions as a weather information obtainment portion and obtains from the weather server 18 the weather information of the area including the observation object 2 when the observation object 2 is photographed. In one example, following the e-mail program 64*b*, the communication portion 65 sends e-mail to the terminal of an operator registered in the address book and also receives e-mail sent from the terminal of the operator. In addition, the communication portion 65 may access an electronic bulletin board system or an SNS.

[First Monitoring Method]

Figure 7:
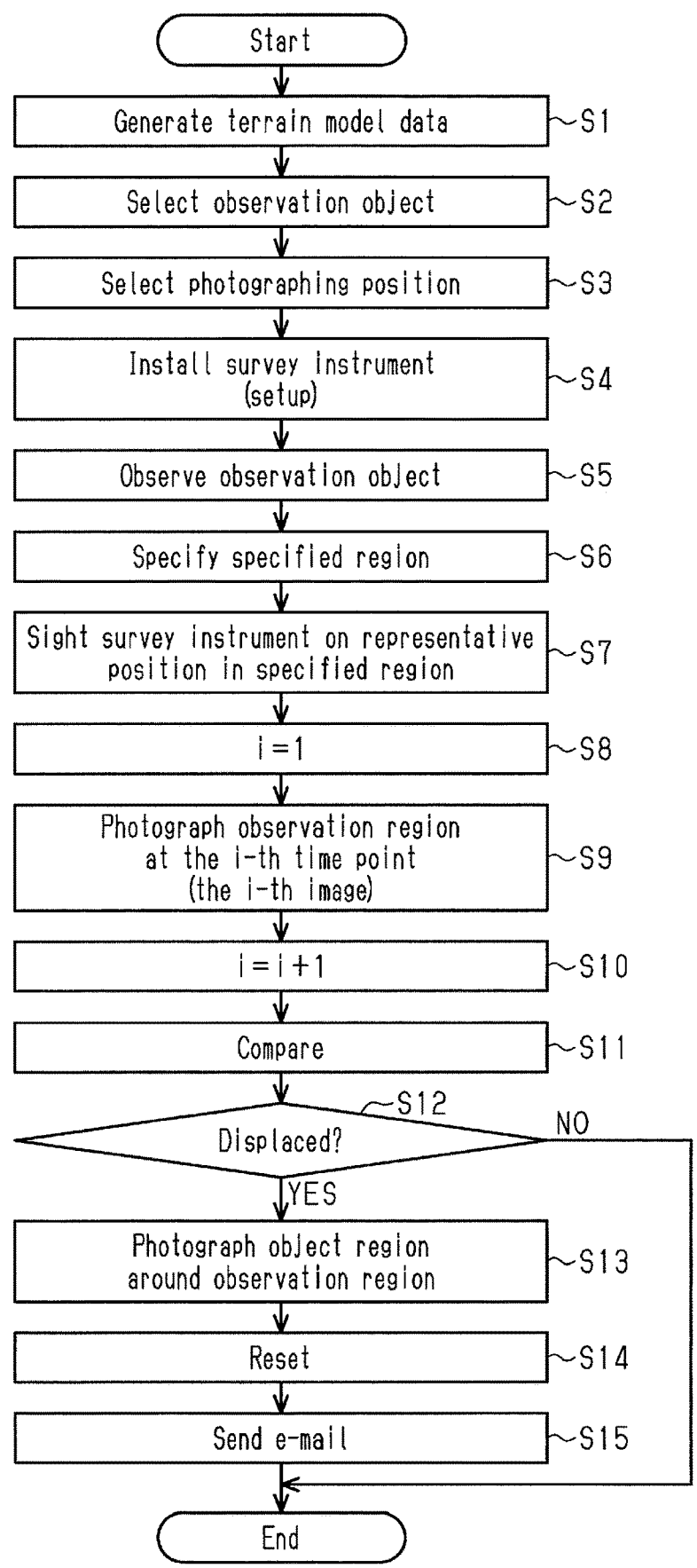
FIG. 7 is a flowchart showing the sequence of a first monitoring method.

To monitor terrain displacement such as a landslide, an observation object 2 needs to be selected from a wide-area observation object 12. In addition, a photographing position 3 needs to be selected at which a survey instrument 20 is installed to photograph the selected observation object 2. As shown in FIG. 7, terrain model data is first generated at step S1. The following two methods may be used to generate terrain model data.

(1) Fly a flying object 11. The wide-area observation object 12 is photographed with the camera of the flying object 11 in flight to generate image data for photogrammetry (the wide-area observation object 12 is photographed once or multiple times at different positions to generate image data of the entire wide-area observation object 12). An orientation process is performed on the image data to generate terrain model data.

(2) Directly measure the wide-area observation object 12 with the three-dimensional measurement device 15 to generate terrain model data.

Terrain model data may be generated only by Method (1), only by Method (2), or by both of Methods (1) and (2). In either of Methods (1) and (2), terrain model data of the entire wide-area observation object 12 may be generated, or terrain model data of a region including one or more potential observation objects 2 or photographing positions 3 may be generated. That is, as will be described below, terrain model data does not have to be of the entire wide-area observation object 12. The terrain model data may be generated only for a part of the wide-area observation object 12 as long as an observation object 2 and a photographing position 3 can be selected.

The flying object 11 used in Method (1) may be an unmanned aerial vehicle and a multicopter. Alternatively, images may be captured with a manned aircraft.

In one example, terrain model data is 3D point cloud data represented in rectangular coordinates, and may be triangulated irregular network (Tin) data, which is a digital data structure that represents the ground surface generated from the 3D point cloud data as a set of triangles, or square mesh data, which divides the ground surface into a number of squares or other polygons following specific rules. In one example, terrain model data is generated in a coordinate system, such as in global coordinates or local coordinates.

At step S2, one or more observation objects 2 may be selected referring to the obtained aerial photographs or the terrain model data, and the positions of the observation objects 2 are specified in the coordinates. The selected observation objects 2 are places that cannot be easily accessed and studied by an operator. Each observation object 2 may be a region that is expected to be displaced, a region that is expected to cause damage when displaced, and a region that is used as a reference to identify displacement of other locations.

At step S3, one or more photographing positions 3 for installing a survey instrument 20, which is used to photograph the observation objects 2, are selected. In one example, one or more photographing positions 3 are selected referring to the obtained aerial photographs or the terrain model data, and the locations of the photographing positions 3 are specified in the coordinates. In one example, one or more photographing positions 3 are selected from an aerial photograph. Each photographing position 3 is set at a safe place that is away from the observation objects 2 and where the survey instrument 20 will not be engulfed by soil or other material when a landslide occurs. Observation objects 2 and photographing positions 3 may be selected by actually going to the site.

After a photographing position 3 is selected, at step S4, a survey instrument 20 is delivered to and installed at the photographing position 3 and set up. In setup, the survey instrument 20 is leveled and centered, and angle and distance measurement is performed for at least two known points so as to set the survey instrument 20 in coordinates, such as global coordinates or local coordinates. The survey instrument 20 may be set up by an operator at the site, or by remote operation using the observation controller 60.

At step S5, the observation controller 60 controls the survey instrument 20 to photograph the observation object 2 and observe the observation point indicated by the reticle (measure the distance and angle). Specifically, this observation obtains observation data of the representative observation point in the observation object 2 indicated by the reticle. The observation data includes distance measurement data, angle measurement data, and observation position information (e.g., observation coordinate data). The observation controller 60 stores the data obtained by the survey instrument 20 in the storage device 14 or other storage. This allows the observation object 2 to be specified in the coordinates, enabling selection of a characteristic region in the observation object 2.

Figure 8:
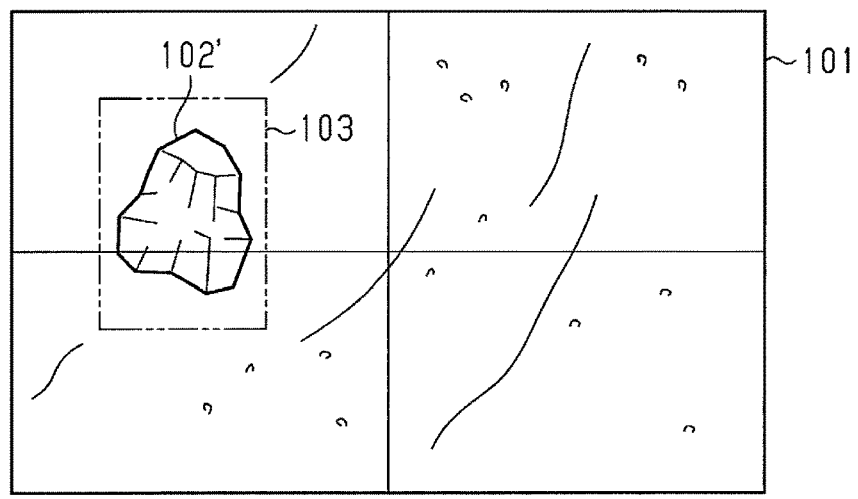
FIG. 8 is a diagram showing an observation image of an observation object photographed with the survey instrument in the first monitoring method.

As shown in FIG. 8, in the first observation method, a characteristic region 102' in an observation image 101 of the observation object 2 is set as the region corresponding to the target 102 in the observation object 2. The operator specifies a specified region 103, which includes the characteristic region 102'. This enables the operator to set the area including the characteristic region 102' as the area for displacement detection, without going to the observation object 2. The observation object 2 may be photographed with either of the first and second photographic portions 31 and 32, and these photographic portions are hereinafter referred to as a photographic portion 27.

At step S6, the control portion 61 of the observation controller 60 sights the survey instrument 20 on the position indicated by the observation position information, which is obtained at step S5 and stored in the storage device 14 or other storage. The survey instrument 20 photographs the observation object 2, on which the survey instrument 20 is sighted. The captured observation image is displayed on the display portion 62. FIG. 8 shows an observation image 101 of the observation object 2 captured with the survey instrument 20. The operator looks at the observation image 101 displayed on the display portion 62 and selects the characteristic region 102'. In one example, the characteristic region 102' is an area in the observation image 101 that corresponds to the target 102 in the observation object 2. In one example, the characteristic region 102' is an area in the observation image 101 that corresponds to a natural object that will not be deformed under normal weather conditions. This natural object is used as the target 102 and may be a rock or a tree, such as a large tree. With the observation controller 60, the specified region 103 including the characteristic region 102' is specified using the operation portion 63, such as the mouse. The specified region 103 is a closed region surrounding the characteristic region 102' and may have a polygonal shape, such as a quadrangular shape, a triangular shape, or a pentagonal shape. The specified region 103 may be defined by a free curve. In one example, the shape of the specified region 103 coincides with the outer shape of the characteristic region 102'. In the following description, the specified region 103 is rectangular. The specified region 103 is used as a reference image that is used to detect displacement. Since the reference image is the region corresponding to the target 102 in the observation object 2, the reference image may be used as a search index and displayed when a list of search results is displayed on the display portion 62.

Figure 9:
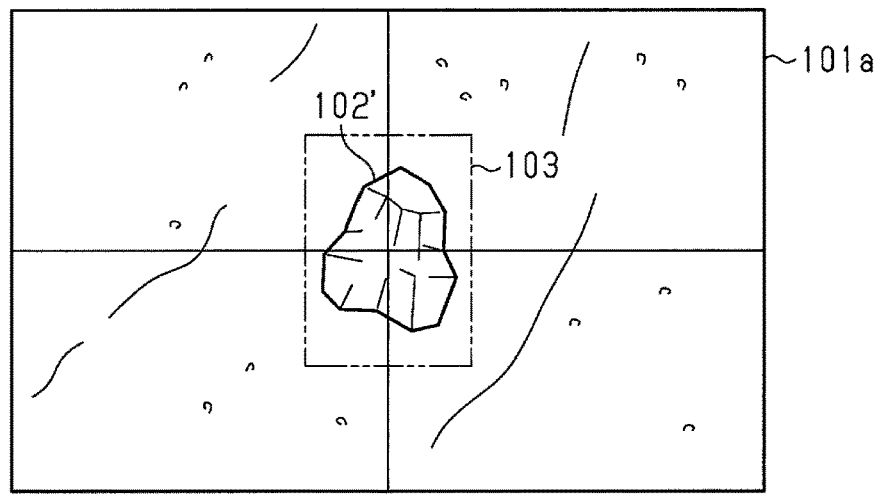
FIG. 9 is a diagram showing a reference observation image having a characteristic region at the center of the angle of view in the first monitoring method.

At step S7, the control portion 61 calculates the centroid of the specified region 103, sets this centroid as the representative position, sights the survey instrument 20 again on this representative position so that the representative position is at the center of the angle of view, and observes the representative position (measures the distance and angle). The representative position is not limited to the centroid. For observation, the survey instrument 20 rotates the photographic portion 27 about the vertical axis and the horizontal axis so that the representative position is at the center of the angle of view. As shown in FIG. 9, a reference observation image 101a is thus captured in which the centroid of the specified region 103 is at the center of the angle of view. The periphery of the specified region 103 may be specified by the distance from the centroid or in the coordinates. The image of the specified region 103 is used as the reference image for detecting displacement. The reference image (the specified region 103) is at the center of the angle of view of the reference observation image 101a. As such, even if displacement occurs and moves the position of the target 102 and thus the characteristic region 102' in a certain direction, the characteristic region 102' will still be present at a certain position within the angle of view. The control portion 61 stores the reference observation data in the storage device 14 or other storage together with the image data of the reference observation image 101a captured with the photographic portion 27. The reference observation data includes distance measurement data and angle measurement data of the representative position relative to the survey instrument 20. The reference observation data also includes the reference position information of the representative position (e.g., the coordinate data).

In one example, when storing the image data of the reference observation image 101a and the reference observation data in the storage device 14 or other storage, the control portion 61 also obtains accurate time information from an external device, such as the GNSS receiver 16, the survey instrument 20, or the NTP server, and stores this information in the storage device 14 or other storage. In one example, the control portion 61 obtains the observation conditions, such as the temperature data obtained by the temperature measuring device 6, the humidity data obtained by the humidity measuring device 7, the barometric data obtained by the barometric pressure measuring device 8, and the photographing conditions and brightness of the photographic portion of the survey instrument 20, and stores the data in the storage device 14 or other storage. In one example, the control portion 61 obtains weather information from the weather server 18 and stores this information in the storage device 14 or other storage.

At step S8, the control portion 61 starts monitoring the observation object 2. Specifically, to identify the time point at which displacement starts and the state during the displacement in order to observe the displacement, the control portion 61, following the observation program 64a, photographs the observation object 2 at short intervals of several minutes or hours (e.g., 5-minute interval or 10-minute interval), instead of longer intervals of one day to several days. In this example, when the photographing time point at which the observation object 2 is photographed is "i" (an integer that is greater than or equal to 1), the image photographed at the i-th time point is referred to as the i-th comparative observation image. The control portion 61 sets "i=1" so that the observation object 2 is photographed at the initial first time point.

At step S9, the control portion 61 performs, at the first time point, sighting and observation (measurement of distance and angle) on the position indicated by the reference position information, photographs the observation object 2, and stores the image data of the first comparative observation image and the comparative observation data in the storage device 14 or other storage. The comparative observation data includes distance measurement data and angle measurement data of the representative position relative to the survey instrument 20. The reference observation data also includes the reference position information of the representative position (e.g., the coordinate data). If the terrain of the position indicated by the reference position information has changed, the distance measurement data included in the comparative observation data is different from the value obtained when the reference observation image 101a is photographed.

At step S10, the control portion 61 adds "1" to "i" and repeats the process from step S9. In one example, at the second time point, the control portion 61 performs sighting and observation (measurement of distance and angle) on the position indicated by the reference position information again, photographs the observation object 2, and stores the image data of the second comparative observation image and the comparative observation data in the storage device 14 or other storage. In one example, at the i-th time point, the control portion 61 performs sighting and observation (measurement of distance and angle) on the position indicated by the reference position information, photographs the observation object 2, and stores the image data of the i-th comparative observation image and the comparative observation data in the storage device 14 or other storage. The first monitoring method monitors the specified region 103 and detects displacement of the characteristic region 102' of the reference observation image 101a by comparing the specified region 103 in the reference observation image 101a and the comparative specified region 103' in the i-th comparative observation image 101b (See FIG. 10).

When one survey instrument 20 monitors a plurality of observation objects 2, between the i-th time point and the (i+1)th time point, the survey instrument 20 rotates the photographic portion 27 about the vertical axis and the horizontal axis so that the position indicated by the reference position information for the next observation object 2 is sighted and photographed.

In one example, when storing the image data of the i-th comparative observation image and the comparative observation data in the storage device 14 or other storage, the control portion 61 obtains accurate time information, various data of the observation conditions, and weather information data from external devices as described above, and stores the information in the storage device 14 or other storage.

At step S11, the control portion 61 extracts, through image recognition, the comparative specified region 103' (FIG. 10) from the i-th comparative observation image captured during the monitoring. The comparative specified region 103' is located at the same position as the specified region 103, which is set at step S7. The image of the comparative specified region 103' is used as a comparative image for comparison with the reference image. The control portion 61 compares the reference image and the comparative image each time when the observation object 2 is photographed and a comparative observation image 101b is generated successively. If the target 102 is displaced, the comparative image differs from the reference image. At step S12, the control portion 61 determines whether the difference between the comparative image and the reference image of the reference observation images 101a is greater than or equal to the threshold. The threshold is set to a value that reduces that likelihood that not only a large displacement like displacement of the target 102 but also a small displacement like swaying plants is detected as displacement of the comparative image with respect to the reference image. If the difference between the reference image and the comparative image is greater than or equal to the threshold and thus displacement is detected between the reference image and the comparative image, the control portion 61 proceeds to step S13. If no displacement is detected, the control portion 61 ends the process.

Figure 10:
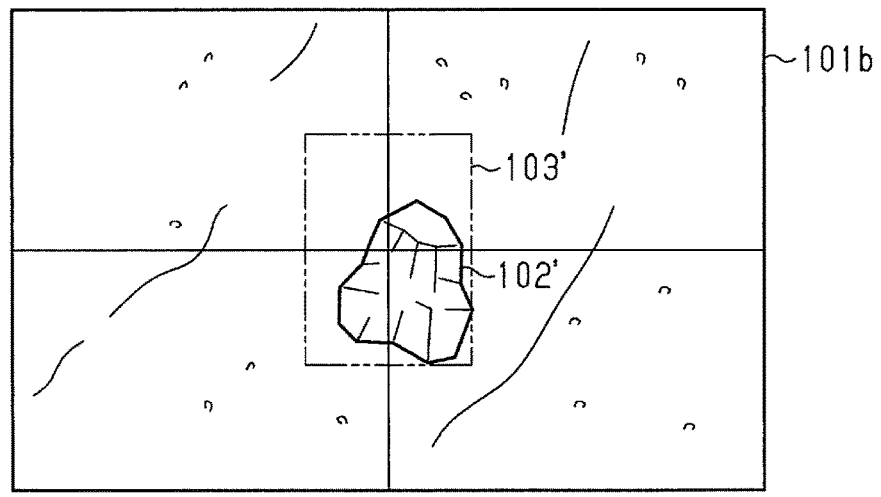
FIG. 10 is a diagram showing a comparative observation image in which the characteristic region is displaced from the center of the angle of view in a certain direction in the first monitoring method.

FIG. 10 shows a comparative observation image 101b in which the target 102 is displaced from the center of the reference observation image 101a.

Figure 11:
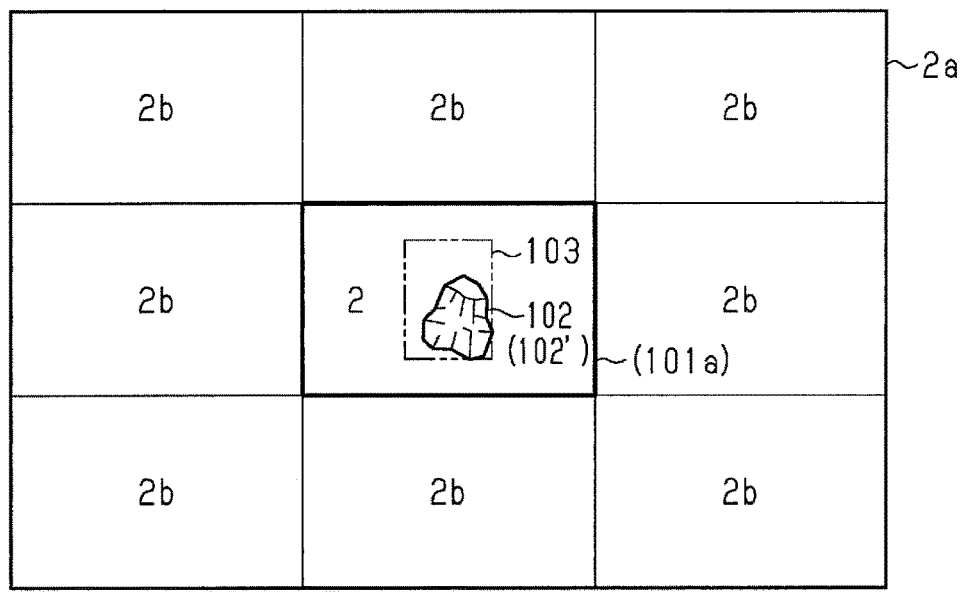
FIG. 11 is a diagram for illustrating the surrounding area of observation object around the observation object in the first monitoring method.

At step S12, even if displacement of the specified region 103 is detected, the extent of the displacement of the target 102 is unknown. The target 102 can be outside the reference observation image 101a. Thus, as shown in FIG. 11, at step S13, in order to photograph an area that is larger than the observation object 2, the control portion 61 controls the survey instrument 20 to photograph a surrounding area of observation object 2a around the current observation object 2. For example, the surrounding area of observation object 2a includes eight regions surrounding the observation object 2 in the center, four regions on the left, right, top, and bottom, and four regions on the upper left, upper right, lower left, and lower right. Each region has a size corresponding to the image area of the photographic portion 27. The control portion 61 performs sighting and observation (measurement of distance and angle) on the representative position of each of surrounding image regions 2b, which form the surrounding area of observation object 2a, and stores observation data in relation to the image data of the surrounding image region 2b. This observation data includes distance measurement data and angle measurement data of the sighting position of the surrounding image region 2b relative to the survey instrument 20. The observation data also includes the sighting position information (e.g., the coordinate data). As such, the state of the surrounding area of observation object 2a, which surrounds the observation object 2 in the center, can also be identified. In one example, the control portion 61 generates a stitched image obtained by combining the comparative observation image 101b of the observation object 2 and the observation image of the surrounding area of observation object 2a.

When displacement is detected, at step S14, the control portion 61 resets the specified region 103. That is, the specified region 103 including the displaced characteristic region 102' is specified again using the operation portion 63, such as the mouse. The control portion 61 calculates the centroid of the specified region 103, sets this centroid as the representative position, sights the survey instrument 20 again on this representative position so that the representative position is at the center of the angle of view, and observes the representative position (measures the distance and angle). The control portion 61 controls the photographic portion 27 to capture an image and stores the image data generated by photographing in the storage device 14 or other storage together with the observation data of the representative position. The new reference observation image 101a after displacement detection is thus obtained, and the control portion 61 repeats the monitoring process from step S9 shown in FIG. 7. That is, monitoring is performed using the state after the displacement as the reference observation image 101a. This prevents the situation where further displacement results in the characteristic region 102' being outside the initial comparative observation image 101b, that is, being impossible to photograph.

In one example, when displacement is detected, the intervals of monitoring are changed from 5 minutes to 3 minutes or 1 minute. In one example, if displacement is not detected for a predetermined duration or longer, the observation intervals are increased from 5 minutes to 10 minutes, for example.

The characteristic region 102' in the reference image (the specified region 103) in the reference observation image 101a is extracted by detecting the outline of the characteristic region 102' through image recognition to obtain the reference position information that indicates the centroid of the characteristic region 102'. In one example, the characteristic region 102' in the reference image (the specified region 103) in the reference observation image 101a is extracted by detecting the outline of the characteristic region 102' through image recognition to obtain the reference position coordinate data that indicates the centroid of the characteristic region 102'. Further, the characteristic region 102' in the comparative image in the comparative observation image 101b is extracted by detecting the outline of the characteristic region 102' through image recognition to obtain the post-displacement position information that indicates the centroid of the characteristic region 102'. Thus, the position of the characteristic region 102' in the reference observation image 101a and the position of the characteristic region 102' in the comparative observation image 101b are known. As such, the characteristic region 102' extracted from the reference observation image 101a and the characteristic region 102' extracted from the comparative observation image 101b can be displayed in one of the reference observation image 101a and the comparative observation image 101b. Further, obtaining the difference between the reference position information and the post-displacement position information enables determination on the direction and the extent of the displacement of the characteristic region 102'. In one example, obtaining the difference between the reference position coordinate data and the post-displacement position coordinate data enables determination on the direction and the extent of the displacement of the characteristic region 102'.

At step S15, the control portion 61 generates an e-mail for notifying operators about the displacement and sends the e-mail to the e-mail addresses registered in the address book of the e-mail program 64b, which serves as an output portion. In one example, the image data of the reference observation image 101a and the comparative observation image 101b captured before and after the displacement is attached to the e-mail. In one example, the e-mail to be sent includes the reference observation data and the comparative observation data, in particular, the distance measurement data included in the reference observation data and the distance measurement data included in the comparative observation data. For example, when the characteristic region 102' in the reference image is no longer present in the comparative image and thus displacement of the specified region 103 is identified, the distance measurement data included in the reference observation data differs from the distance measurement data included in the comparative observation data, indicating that displacement has occurred in the terrain. Including the distance measurement data in the e-mail allows the operators to identify the variation in the distance measurement data. In one example, the image data of the surrounding image regions 2b in the surrounding area of observation object 2a is attached to the e-mail. Further, in one example, when receiving an e-mail from the observation controller 60, the terminal of an operator outputs an alarm sound from the speaker so that the operator may immediately notice the e-mail. In one example, the control portion 61 announces the displacement through an outdoor speaker of a municipal disaster prevention radio. Other means of notifying operators or others include notification through an electric bulletin board and post-sharing services, such as an electronic bulletin board system and an SNS.

When monitoring is performed at night, the control portion 61 compares the distance measurement data included in the reference observation data obtained when photographing the reference observation image 101a with the distance measurement data included in the comparative observation data obtained when photographing the comparative observation image 101b. When the difference between the two distance measurement data pieces is greater than or equal to the threshold, the control portion 61 determines that displacement has occurred in the specified region 103. This method is used because the entire angle of view is uniformly dark in the comparative observation image 101b photographed at night, making it difficult to detect any displacement of the characteristic region from this image.

During monitoring, an obstacle may be placed between the survey instrument 20 and the observation object 2, changing the distance measurement data. In this case, the obstacle may be removed, or the position of the observation object 2 may be changed.

[Second Monitoring Method]

Figure 12:
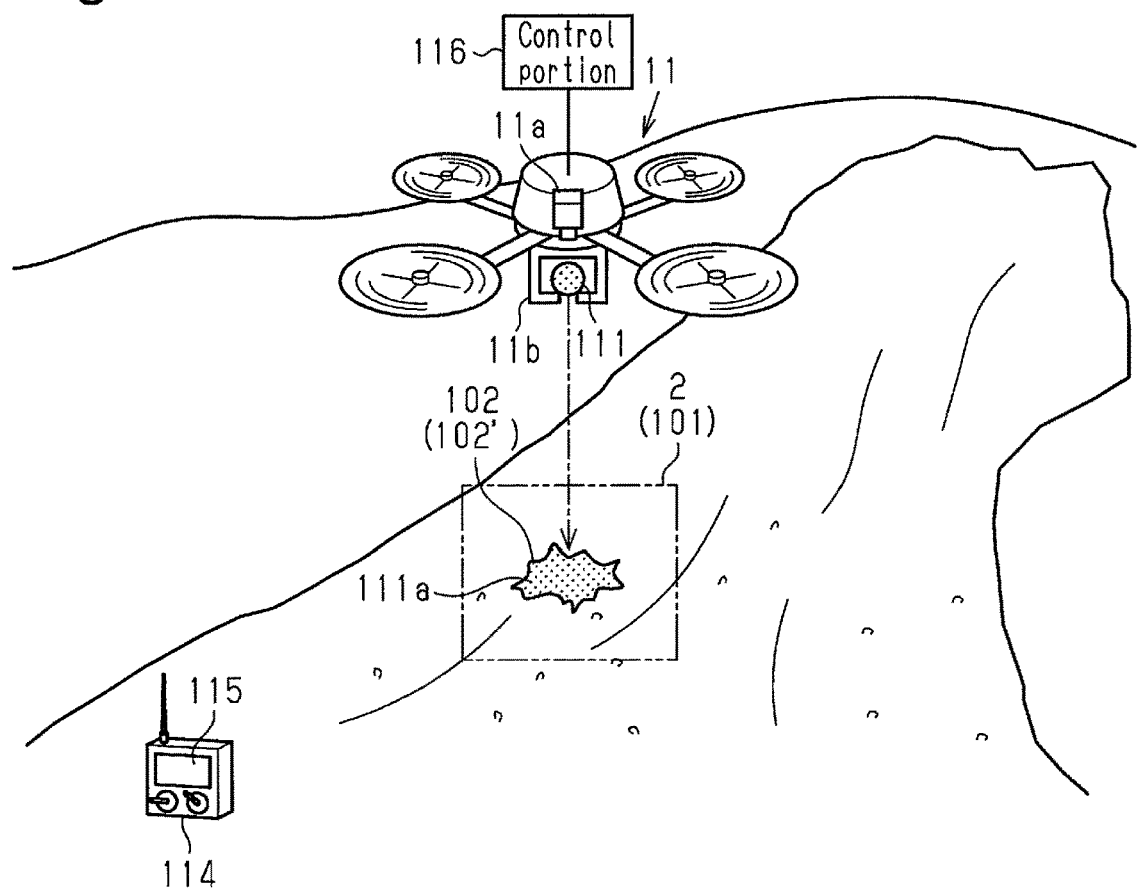
FIG. 12 is a diagram showing a second monitoring method of guiding a flying object to an observation object to set a target with observation paint.

As shown in FIG. 12, the second monitoring method uses, as the target 102 in an observation object 2, an application region to which observation paint 111*a* is applied with a flying object 11. Accordingly, the target 102 in the observation object 2 is detected with the survey instrument 20 more reliably than the natural object used in the first monitoring method. In addition, applying the observation paint 111*a* enables the target 102 to be prepared by artificial means even when the ground surface of the observation object 2 does not include any natural object that is easily noticeable as a target. In one example, the observation paint 111*a* is paint having high reflectance to the distance measuring light wave from the distance measuring portion 33. In one example, the observation paint 111*a* is aqueous paint. In one example, the observation paint 111*a* is paint that does not contain harmful chemical substances. If the observation object 2 includes a natural object (e.g., a rock or a tree), the observation paint 111*a* may be applied to this natural object. If the observation object 2 does not include a natural object, the observation paint 111*a* may be applied to the ground surface of soil.

In the third monitoring method described below, an observation target 111*b* is used as an artificial target 102, and the observation target 111*b* is held by a holding portion 11*b*.

Figure 13:
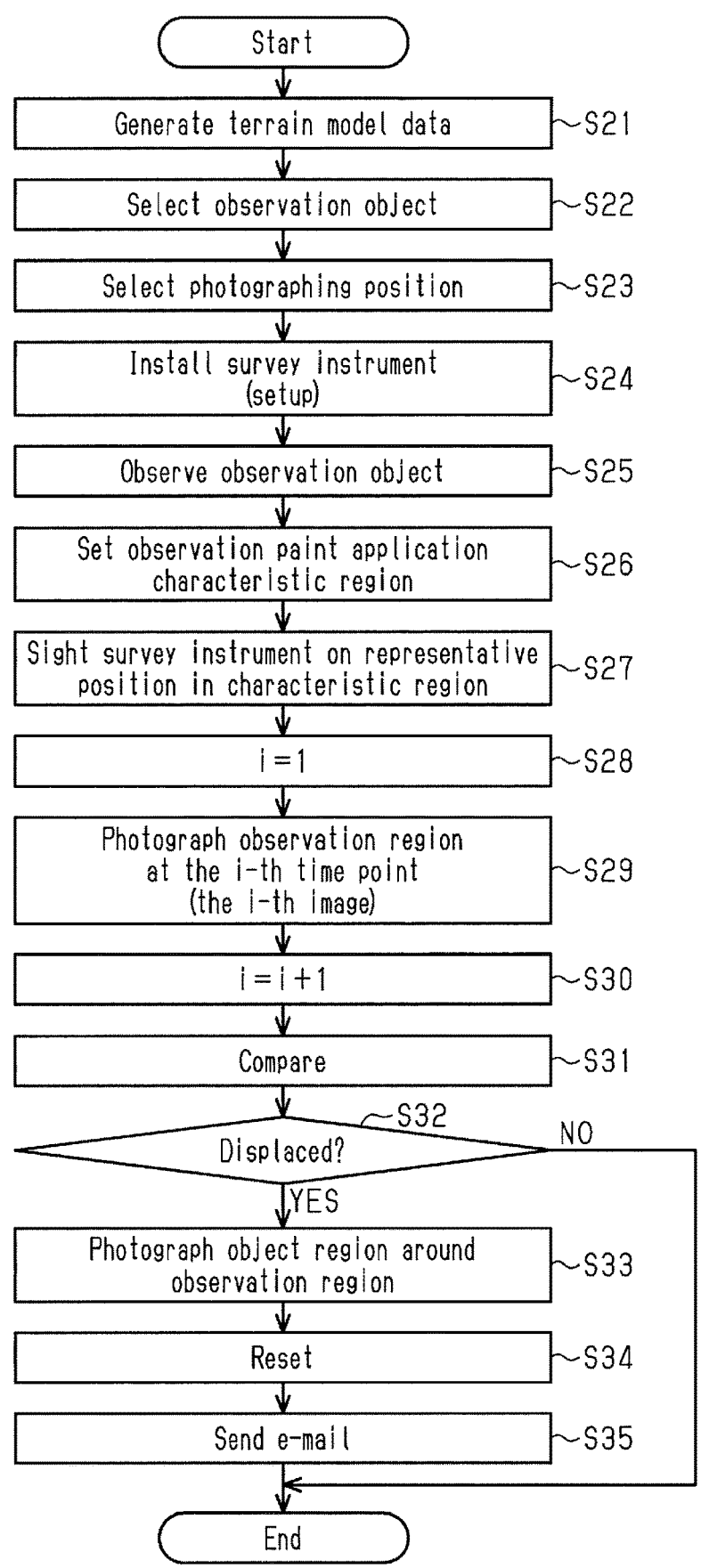
FIG. 13 is a flowchart showing the sequence of the second monitoring method.

As shown in FIG. 13, terrain model data is also generated in the second monitoring method at step S21. In the same manner as the first monitoring method, the wide-area observation object 12 is photographed with the camera of the flying object 11 to generate image data for photogrammetry. An orientation process is performed on the image data to generate terrain model data. Alternatively, the second monitoring method generates terrain model data by directly measuring the wide-area observation object 12 with the three-dimensional measurement device 15.

At step S22, one or more observation objects 2 may be selected referring to the obtained aerial photographs or the terrain model data, and the positions of the observation objects 2 are specified in the coordinates. At step S23, one or more photographing positions 3 for installing a survey instrument 20, which is used to photograph the observation objects 2, are selected. After a photographing position 3 is selected, at step S24, a survey instrument 20 is delivered to and installed at the photographing position 3 and set up.

At step S25, the observation controller 60 controls the survey instrument 20 to photograph the observation object 2 and observe (measure the distance and angle) the observation point indicated by the reticle. Specifically, this observation obtains observation data of the representative observation point in the observation object 2 indicated by the reticle. The observation data includes distance measurement data, angle measurement data, and observation position information (e.g., observation coordinate data). The observation controller 60 stores the data obtained by the survey instrument 20 in the storage device 14 or other storage. This allows the observation object 2 to be specified in the coordinate, enabling guiding of the flying object 11 to the observation object 2.

At step S26, the observation paint 111*a* is mounted on the flying object 11, and the control portion 61 of the observation controller 60 guides the flying object 11 to the selected observation object 2 to set a target 102 in the observation object 2. The flying object 11 applies the observation paint 111*a* to the target position in the observation object 2.

As shown in FIG. 12, to set the target 102 by applying the observation paint 111*a* to the observation object 2, the flying object 11, which is an unmanned aerial vehicle such as a multicopter, is prepared. The flying object 11 may include a camera 11*a*, which is capable of photographing the area below, and a holding portion 11*b*, which holds a holder 111 for holding the observation paint 111*a*. The flying object 11 is guided to the position indicated by the observation position information specified by the operator using the terrain model data. In one example, the flying object 11 is remotely operated and guided to the position indicated by the observation position information with a remote controller 114. In one example, when the flying object 11 includes a GNSS reception portion and is able to locate its position, the observation position information is set in the program so that the flying object 11 is automatically flown to the position indicated by the observation position information (without being controlled with the remote controller 114). The observation paints 111*a* is then applied to the observation object 2. Still images and dynamic images based on the image data photographed and generated by the camera 11*a* are displayed on the monitor 115 of the remote controller 114 or the display portion 62 of the observation controller 60. The operator gives an instruction for application while looking at the monitor 115 or the display portion 62 to apply the observation paint 111*a*. During application, the image captured with the camera 11*a* is displayed on the monitor 115 or the display portion 62, allowing the operator to see the area below the flying object 11. In addition, still or dynamic images captured with the survey instrument 20 may be displayed on the monitor 115 or the display portion 62, allowing the operator to look at the flying object 11 and the observation object 2 from the viewpoint of the survey instrument 20. On the monitor 115 and the display portion 62, the image captured with the camera 11*a* and the image captured with the survey instrument 20 may be switched, or may be displayed side by side on the screen.

Further, when the observation paint 111*a* is failed to be accurately applied to the target position, for example, the operator sends an additional instruction through the remote controller 114 to correct the position of the flying object 11.

In one example, the holding portion 11*b* of the flying object 11 holds the holder 111, which may be a basket fixed to the gimbal of the flying object 11. The holder 111 holds a color ball impregnated with the observation paint 111*a*, or a balloon containing the observation paint 111*a*, for example. When the flying object 11 reaches the observation object 2, the operator remotely rotates or tilts the holder 111 and drops the color ball or the paint balloon while looking at the image captured with the camera 11*a* or the survey instrument 20. The impact from the fall scatters the observation paint 111*a* impregnated in the color ball or raptures the balloon, causing the observation paint 111*a* to be scattered onto the ground or other object. This forms a characteristic region 102', which is the spread observation paint 111*a*, in the observation object 2.

In one example, the holding portion 11*b* holds the holder 111, which is a basket that is attached to the gimbal of the flying object 11 and has a base, which is opened and closed. The holder 111, while closed, holds a color ball impregnated with the observation paint 111*a* or a balloon containing the observation paint 111*a*, for example. When the flying object 11 reaches the observation object 2, the operator remotely opens the holder 111 to drop the color ball or the paint balloon, while looking at the image captured with the camera 11*a* or the survey instrument 20.

The example described above drops the color ball impregnated with the observation paint 111a or the balloon containing the observation paint 111a from a high altitude. To apply the observation paint 111a to the exact position, the color ball or the balloon is preferably dropped from a lower altitude.

In one example, the holding portion 11b uses the gimbal of the flying object 11 to hold the holder 111, which is a container containing the observation paint 111a. The holder 111 is formed such that its base is opened by a pressing force or impact when it comes into contact with the ground. At the observation object 2, the operator may lower the flying object 11 while looking at the image captured with the camera 11a or the survey instrument 20 so as to bring the holder 111 into contact with the ground. The pressing force or impact caused by this contact opens the base of the holder 111, thereby applying the observation paint 111a to the ground or other object. This method applies the observation paint 111a from a position close to the ground, allowing the observation paint 111a to be applied to the exact position, as compared with the method that drops the observation paint 111a from a high altitude.

In one example, the holding portion 11b includes a spray can of the observation paint 111a attached to the gimbal of the flying object 11. In this case, the operator may lower the flying object 11 at the observation object 2 while looking at the image captured with the camera 11a or the survey instrument 20, and apply the observation paint 111a by spraying it from the spray can near the ground.

After the observation paint 111a is applied, the flying object 11 ascends, and the operator checks, based on the image captured with the camera 11a or the survey instrument 20, whether the observation paint 111a is applied to the correct position and the target 102 is set. If the observation paint 111a is not applied to the correct position, a process of reattempting is performed to repeat the application of the observation paint 111a. When the observation paint 111a is correctly applied, the flying object 11 is guided to the next observation object 2.

In one example, when multiple observation objects 2 are selected, the flying object 11 applies the observation paint 111a to one of the observation objects 2 to set a target 102. Then, the flying object 11 is guided to the next observation object 2 to apply the observation paint 111a to set a target 102 in this observation object 2. To set multiple targets 102 by successively applying the observation paint 111a to observation objects 2, the flying object 11 is preferably flown along the shortest route.

Further, the flying object 11 includes a control portion 116 for controlling the camera 11a and a motor or an engine, which serves as a driving portion, in response to a command signal from the remote controller 114 or the observation controller 60. In accordance with the remote controller 114 or the observation controller 60, the control portion 116 controls and drives the holding portion 11b to drop the color ball or the balloon. The control portion 116 also controls the driving portion to fly the flying object 11 along the flight route to drop the color ball or the balloon to the target position.

Figure 14:
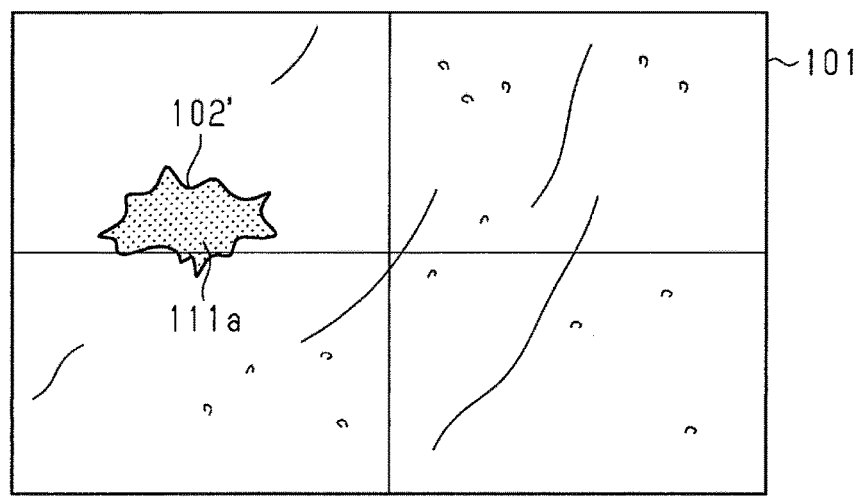
FIG. 14 is a diagram showing an observation image of an observation object photographed with the survey instrument in the second monitoring method.
Figure 15:
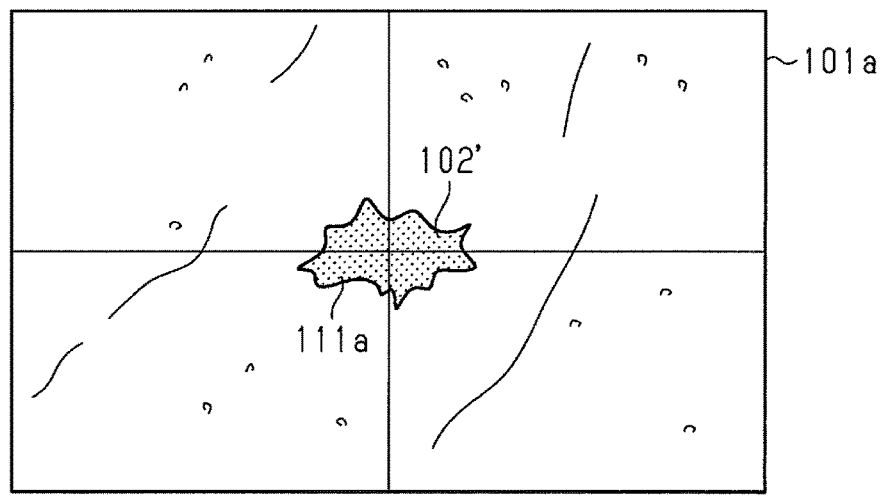
FIG. 15 is a diagram showing a reference observation image having a characteristic region at the center of the angle of view in the second monitoring method.

At step S26, the control portion 61 sights the survey instrument 20 on the position indicated by the observation position information, which is obtained at step S25 and stored in the storage device 14. The survey instrument 20 photographs the observation object 2, on which the survey instrument 20 is sighted. As shown in FIG. 14, the captured observation image 101 is displayed on the display portion 62. The control portion 61 extracts the characteristic region 102' from the observation image 101 by detecting the outline of the target 102, which is formed by the area to which the observation paint 111a is applied, through image recognition. In one example, at step S27, the control portion 61 calculates the centroid of the characteristic region 102', sets this centroid as the representative position, sights the survey instrument 20 again on this representative position so that the representative position is at the center of the angle of view, and observes the representative position (measures the distance and angle). The representative position is not limited to the centroid and may be an area in the characteristic region 102' that has the characteristic shape of the target 102. As shown in FIG. 15, the photographic portion 27 thus obtains a reference observation image 101a. The image data of the reference observation image 101a is stored in the storage device 14 or other storage together with the reference observation data of this representative position. Accordingly, the reference observation image 101a has the centroid of the characteristic region 102' in the center of the angle of view. Then, the characteristic region 102' in the reference observation image 101a is set as the reference image. The reference image (the characteristic region 102') is at the center of the angle of view of the reference observation image 101a. As such, even if displacement occurs and moves the position of the target 102 and thus the characteristic region 102' in a certain direction, the characteristic region 102' will still be present at a certain position within the angle of view. The control portion 61 stores the reference observation data in the storage device 14 or other storage together with the image data of the reference observation image 101a captured with the photographic portion 27.

In one example, when storing the image data of the reference observation image 101a and the reference observation data in the storage device 14 or other storage, the control portion 61 obtains accurate time information, various data of the observation conditions, and weather information data from external devices, and stores the information in the storage device 14 or other storage.

At step S28, the control portion 61 starts monitoring the observation object 2. Specifically, the control portion 61 sets "i=1" so that the observation object 2 is photographed at the initial first time point. At the first time point, the control portion 61 performs, at step S29, sighting and observation (measurement of distance and angle) on the position indicated by the reference position information, photographs the observation object 2, and stores the image data of the first comparative observation image and the comparative observation data in the storage device 14 or other storage.

At step S30, the control portion 61 adds "1" to "i" and repeats the process from step S29. In one example, at the i-th time point, the control portion 61 performs sighting and observation (measurement of distance and angle) on the position indicated by the reference position information, photographs the observation object 2, and stores the image data of the i-th comparative observation image and the comparative observation data in the storage device 14 or other storage. That is, the second monitoring method monitors the target 102 formed of the observation paint 111a and detects displacement of the characteristic region 102' in the reference observation image 101a by comparing the characteristic region 102' in the reference observation image 101a and the comparative region 102" in the i-th comparative observation image 101b, which is at the same place as the characteristic region 102' (See FIG. 16).

In one example, when storing the image data of the i-th comparative observation image and the comparative observation data in the storage device 14 or other storage, the control portion 61 obtains accurate time information, various data of the observation conditions, and weather information data from external devices as described above, and stores the information in the storage device 14 or other storage.

When one survey instrument 20 monitors a plurality of observation objects 2, between the i-th time point and the (i+1)th time point, the survey instrument 20 rotates the photographic portion 27 about the vertical axis and the horizontal axis so that the position indicated by the reference position information for the next observation object 2 is sighted and photographed.

The displacement detection of the characteristic region 102' is now described.

At step S31, the control portion 61 extracts from the i-th comparative observation image 101*b*, which is captured during monitoring, an image that is at the same place as the reference image set at step S27 (the characteristic region 102') through image recognition. The extracted image is set as the comparative image 102" (FIG. 16) used for comparison with the reference image (characteristic region 102'). The control portion 61 compares the reference image (the characteristic region 102') and the comparative image 102" each time when the observation object 2 is photographed and a comparative observation image 101*b* is generated successively. If the reference image (the characteristic region 102') is displaced, the comparative image 102" differs from the reference image (the characteristic region 102').

At step S32, the control portion 61 determines whether the difference between the reference image (the characteristic region 102') and the comparative image 102" is greater than or equal to the threshold. The threshold is set to a value that reduces that likelihood that insignificant displacement such as a slight displacement of soil on the ground surface caused by weather is detected as displacement of the comparative image 102" with respect to the reference image (the characteristic region 102'). If the difference between the reference image (the characteristic region 102') and the comparative image 102" is greater than or equal to the threshold and thus displacement is detected between the reference image and the comparative image, the control portion 61 proceeds to the next process. If no displacement is detected, the control portion 61 ends the process.

Figure 16:
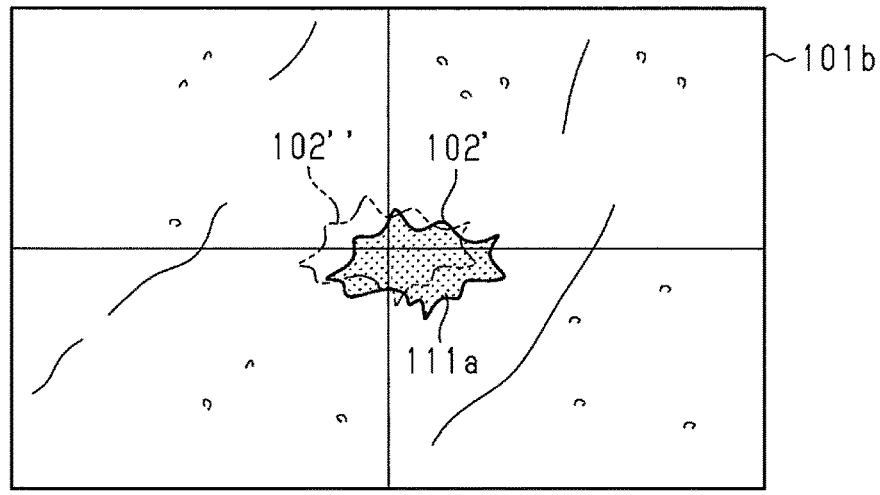
FIG. 16 is a diagram showing a comparative observation image in which the characteristic region is displaced from the center of the angle of view in a certain direction in the second monitoring method.

Further, as shown in FIG. 16, the control portion 61 extracts the displaced characteristic region 102' in the comparative observation image 101*b* by detecting the outline of the target 102 through image recognition. In one example, the control portion 61 calculates the centroid of the characteristic region 102' in the comparative observation image 101*b*, sets this centroid as the representative position, sights the survey instrument 20 again on this representative position so that the representative position is at the center of the angle of view, and observes the representative position (measures the distance and angle). The post-displacement observation data includes distance measurement data and angle measurement data of the representative position relative to the survey instrument 20. The post-displacement observation data also includes the post-displacement position information of the displaced representative position (e.g., the coordinate data). The post-displacement observation data of the representative position is stored in the storage device 14 or other storage. This allows comparison between the position of the characteristic region 102' that serves as the reference image and the characteristic region 102' in the comparative observation image 101*b*. In one example, the characteristic region 102' extracted from the reference observation image 101*a* and the characteristic region 102' extracted from the comparative observation image 101*b* can be displayed in one of the reference observation image 101*a* and the comparative observation image 101*b*. Further, obtaining the difference between the reference position information and the post-displacement position information enables determination on the direction and the extent of the displacement of the characteristic region 102'. In one example, obtaining the difference between the reference position coordinate data and the post-displacement position coordinate data enables determination on the direction and the extent of the displacement of the characteristic region 102'.

Then, at step S33, to identify the state of the surrounding area of observation object 2*a*, which surrounds the observation object 2 in the center, the control portion 61 photographs the surrounding area of observation object 2*a* around the current observation object 2 with the survey instrument 20 so as to photograph an area that is larger than the observation object 2.

When displacement is detected, at step S34, the control portion 61 resets the reference image. That is, the control portion 61 calculates the centroid of the characteristic region 102' extracted from the comparative observation image 101*b*, sets this centroid as the representative position, sights the survey instrument 20 again on this representative position so that the representative position is at the center of the angle of view, and observes the representative position (measures the distance and angle). The control portion 61 controls the photographic portion 27 to capture an observation image 101 and stores the image data generated by photographing in the storage device 14 or other storage together with the observation data of the representative position. The new reference observation image 101*a* after displacement detection is thus obtained, and the control portion 61 repeats the monitoring process from step S28. That is, monitoring is performed using the state after the displacement as the reference observation image 101*a*. This prevents the situation where further displacement results in the characteristic region 102' being outside the initial comparative observation image 101*b*, that is, being impossible to photograph.

In one example, when displacement is detected, the intervals for monitoring are changed from 5 minutes to 3 minutes or 1 minute. In one example, if displacement is not detected for a predetermined duration or longer, the observation intervals are increased from 5 minutes to 10 minutes, for example.

At step S35, the control portion 61 generates an e-mail for notifying operators about the displacement and sends the e-mail to the e-mail addresses registered in the address book of the e-mail program 64*b*. Other means of notifying operators or others include notification through an electric bulletin board and post-sharing services, such as an electronic bulletin board system and an SNS.

[Third Monitoring Method]

Figure 17:
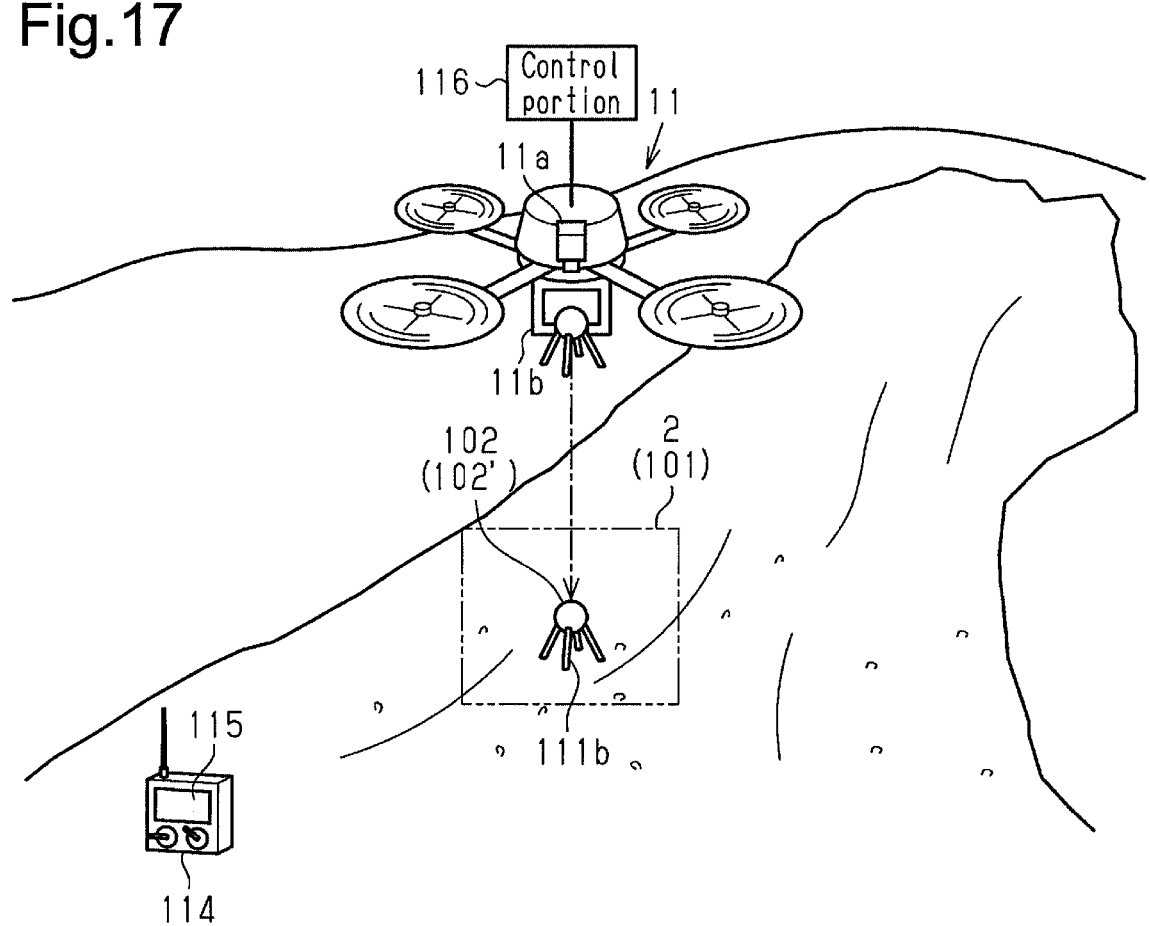
FIG. 17 is a diagram showing a third monitoring method of guiding a flying object to an observation object to set a target with an observation target.

As shown in FIG. 17, the third monitoring method uses an observation target 111*b* as the target 102 in an observation object 2. This allows for reliable detection of the target 102 in the observation object 2 with a survey instrument 20, as compared with a natural object, such as a rock, used in the first monitoring method. Use of the observation target 111*b* enables the target 102 to be set by artificial means even when a natural object is not present, or when the ground surface is covered by soil or other material such that a natural object that is noticeable as a target is not present on the ground. In an example using the observation target 111*b*, the observation target 111b may be delivered to the target position in the observation object 2 with a flying object 11.

The observation target 111b has a structure that can be recognized with the survey instrument 20 for monitoring. To this end, the observation target 111b includes a reflective portion. In one example, a target portion 112 is made of a reflective material. In one example, a reflective member is fixed to a target portion 112. The reflective member may be fixed to the target portion 112 by adhesion or engagement. The reflective member may be a reflective sheet or a prism. The target portion 112 may have a reflective portion made of a retroreflective material. This allows the observation target 111b to reflect the distance measuring light, which is emitted from the survey instrument 20, toward the survey instrument 20, for example, facilitating the measurement of the distance to the observation target 111b with the survey instrument 20. The reflective portion may extend entirely or partially over the target portion 112.

Figure 18A:
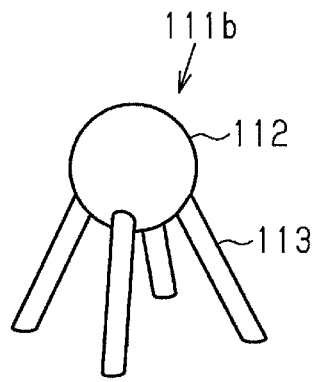
FIGS. 18A to 18C are diagrams showing observation targets.
Figure 18B:
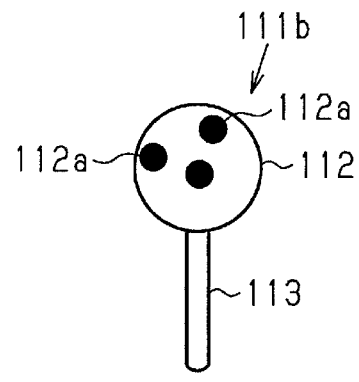
Figure 18C:
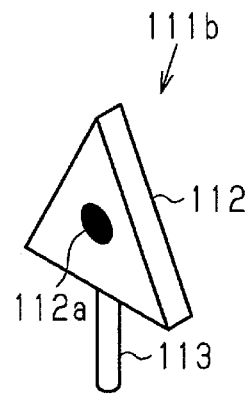

FIGS. 18A to 18C schematically show observation targets 111b. The example of an observation target 111b shown in FIG. 18A includes a target portion 112 and a plurality of legs 113. The target portion 112 may be a sphere, and the entire surface of the target portion 112 may function as a reflective member. More than one leg 113 is provided. Providing three or more legs achieves stable support for the target portion 112.

The example of an observation target 111b shown in FIG. 18B includes only one leg 113. When the ground surface is soft, the leg 113 may be stuck into the ground surface to support the target portion 112. This example includes a plurality of reflective members 112a on the target portion 112. However, the target portion 112 may include only one reflective member 112a.

The spherical target portion 112 may be detected with the survey instrument 20 even if the observation target 111b is not supported by the leg 113 and lies on the ground.

The example of an observation target 111b shown in FIG. 18C includes a target portion 112, which is a triangular plate and has a reflective member 112a on one or both sides. The reflective member 112a may be provided entirely or partly on each surface. The reflective member 112a is made of a material of high reflectivity to the distance measuring light from the survey instrument 20. The reflective member 112a may be a prism or a retroreflective material. In one example, the target portion 112 is shaped as a regular triangle, so that the orientation of the target can be identified when the target portion 112 does not face the survey instrument 20. One side of the target portion 112 has a single leg 113. However, a plurality of legs 113 may be provided on one side, or each side may include one or more legs 113. Further, one or more legs 113 may extend obliquely downward from one of the faces (the back face).

Figure 19:
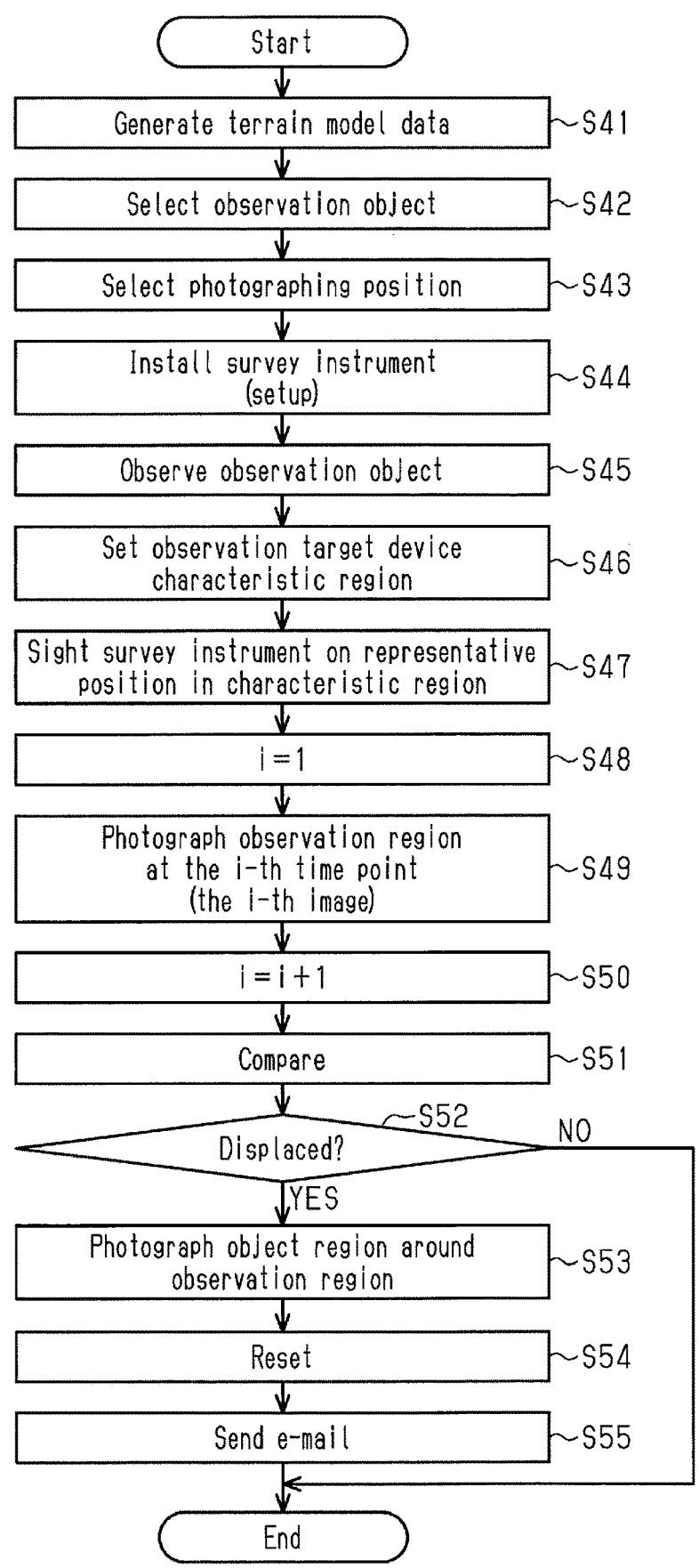
FIG. 19 is a flowchart showing the sequence of the third monitoring method.

Referring to FIG. 19, the process sequence of the third monitoring method is now described. At step S41, terrain model data is generated. In the same manner as the first and second monitoring methods, the wide-area observation object 12 is photographed with the camera of the flying object 11 to generate image data for photogrammetry. An orientation process is performed on the image data to generate terrain model data. Alternatively, the third monitoring method generates terrain model data by directly measuring the wide-area observation object 12 with the three-dimensional measurement device 15.

At step S42, one or more observation objects 2 may be selected referring to the obtained aerial photographs or the terrain model data, and the positions of the observation objects 2 are specified in the coordinates. At step S43, one or more photographing positions 3 for installing a survey instrument 20, which is used to photograph the observation objects 2, are selected. After a photographing position 3 is selected, at step S44, a survey instrument 20 is delivered to and installed at the photographing position 3 and set up.

At step S45, the observation controller 60 controls the survey instrument 20 to photograph the observation object 2 and observe (measure the distance and angle) the observation point indicated by the reticle. Specifically, this observation obtains observation data of the representative observation point in the observation object 2 indicated by the reticle. The observation data includes distance measurement data, angle measurement data, and observation position information (e.g., observation coordinate data). The observation controller 60 stores the data obtained by the survey instrument 20 in the storage device 14 or other storage. This allows the observation object 2 to be specified in the coordinates, enabling guiding of the flying object 11 to the observation object 2.

At step S46, to set a characteristic region 102' in the observation object 2 by placing an observation target 111b, the observation target 111b is mounted on the flying object 11, and the control portion 61 of the observation controller 60 guides the flying object 11 to the selected observation object 2 and sets the observation target 111b at the target position. The observation target 111b may be placed at the target position by dropping the observation target 111b from the flying object 11, or by lowering the flying object 11 close to the ground to place the observation target 111b. The flying object 11 is guided to the position indicated by the observation position information specified by the operator using the terrain model data. In one example, the flying object 11 is guided to the position indicated by the observation position information with the remote controller 114. In one example, when the flying object 11 includes a GNSS reception portion and is able to locate its position, the observation position information is set in the program so that the flying object 11 is automatically flown to the position indicated by the observation position information (without being controlled with the remote controller 114). The observation target 111b is thus set in the observation object 2.

In one example, when a plurality of observation objects 2 is selected, the flying object 11 sets an observation target 111b in one of the observation objects 2 to set a target 102 and then guided to the next observation object 2 to set an observation target 111b in this observation object 2 to set a target 102.

Figure 20:
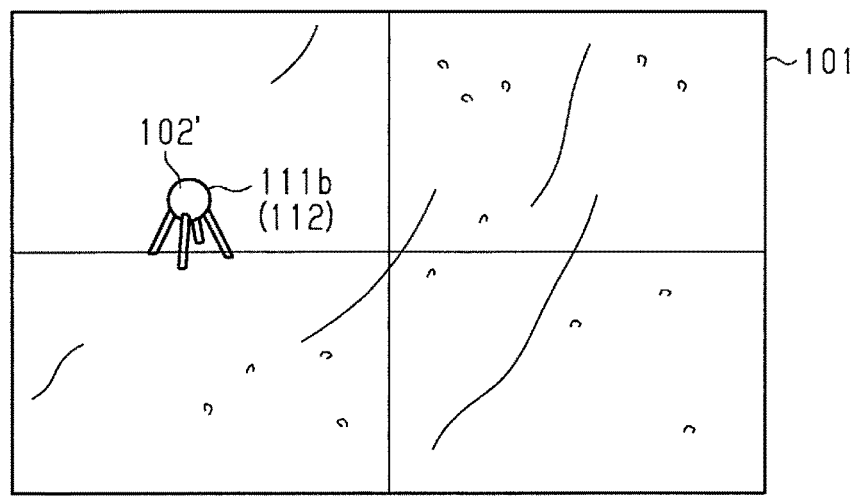
FIG. 20 is a diagram showing an observation image of an observation object photographed with the survey instrument in the third monitoring method.
Figure 21:
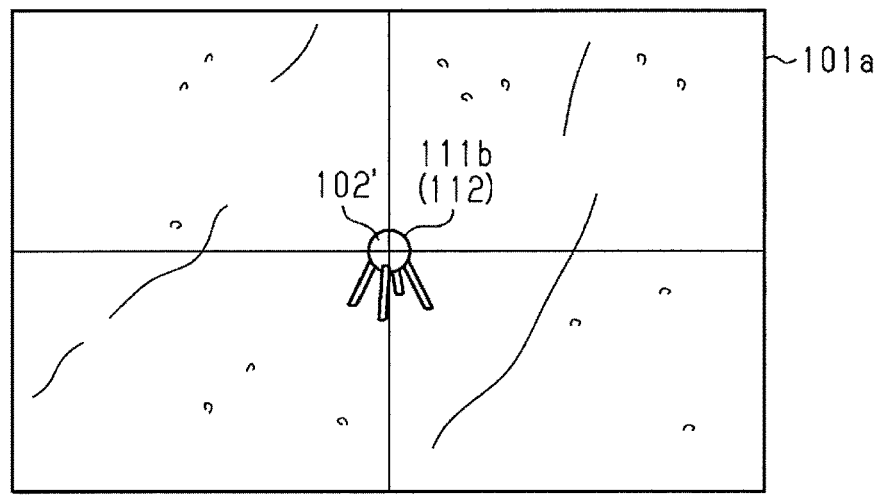
FIG. 21 is a diagram showing a reference observation image having a characteristic region at the center of the angle of view in the third monitoring method.

At step S47, the control portion 61 sights the survey instrument 20 on the position indicated by the observation position information, which is obtained at step S45 and stored in the storage device 14. The survey instrument 20 photographs the observation object 2, on which the survey instrument 20 is sighted. As shown in FIG. 20, the captured observation image 101 is displayed on the display portion 62. The control portion 61 extracts the characteristic region 102' from the observation image 101 by detecting the outline of the target 102, which is formed by the observation target 111b, through image recognition. In one example, the control portion 61 calculates the centroid of the characteristic region 102', sets this centroid as the representative position, sights the survey instrument 20 again on this representative position so that the representative position is at the center of the angle of view, and observes the representative position (measures the distance and angle). The representative position is not limited to the centroid and may be an area in the characteristic region 102' that has the characteristic shape of the observation target 111b. As shown in FIG. 21, the photographic portion 27 thus obtains a reference observation image 101*a*. The image data of the reference observation image 101*a* is stored in the storage device 14 or other storage together with the reference observation data of this representative position. Accordingly, the reference observation image 101*a* has the centroid of the characteristic region 102' in the center of the angle of view. Then, the characteristic region 102' in the reference observation image 101*a* is set as the reference image. The reference image (the characteristic region 102') is at the center of the angle of view of the reference observation image 101*a*. As such, even if displacement occurs and moves the position of the target 102 and thus the characteristic region 102' in a certain direction, the characteristic region 102' will still be present at a certain position within the angle of view. The control portion 61 stores the reference observation data in the storage device 14 or other storage together with the image data of the reference observation image 101*a* captured with the photographic portion 27.

In one example, when storing the image data of the reference observation image 101*a* and the reference observation data in the storage device 14 or other storage, the control portion 61 obtains accurate time information, various data of the observation conditions, and weather information data from external devices, and stores the information in the storage device 14 or other storage.

At step S48, the control portion 61 starts monitoring the observation object 2. Specifically, the control portion 61 sets "i=1" so that the observation object 2 is photographed at the initial first time point. At the first time point, the control portion 61 performs, at step S49, sighting and observation (measurement of distance and angle) on the position indicated by the reference position information, photographs the observation object 2, and stores the image data of the first comparative observation image and the comparative observation data in the storage device 14 or other storage.

At step S50, the control portion 61 adds "1" to "i" and repeats the process from step S49. In one example, at the i-th time point, the control portion 61 performs sighting and observation (measurement of distance and angle) on the position indicated by the reference position information, photographs the observation object 2, and stores the image data of the i-th comparative observation image and the comparative observation data in the storage device 14 or other storage. That is, the third monitoring method monitors the target 102 formed by the observation target 111*b* and detects displacement of the characteristic region 102' in the reference observation image 101*a* by comparing the characteristic region 102' in the reference observation image 101*a* and the comparative region 102" in the i-th comparative observation image 101*b*, which is at the same place as the characteristic region 102'.

In one example, when storing the image data of the i-th comparative observation image and the comparative observation data in the storage device 14 or other storage, the control portion 61 obtains accurate time information, various data of the observation conditions, and weather information data from external devices as described above, and stores the information in the storage device 14 or other storage.

When one survey instrument 20 monitors a plurality of observation objects 2, between the i-th time point and the (i+1)th time point, the survey instrument 20 rotates the photographic portion 27 about the vertical axis and the horizontal axis so that the position indicated by the reference position information for the next observation object 2 is sighted and photographed.

The displacement detection of the characteristic region 102' is now described.

At step S51, the control portion 61 extracts from the i-th comparative observation image 101*b*, which is captured during monitoring, an image that is at the same place as the reference image set at step S47 (the characteristic region 102') through image recognition. The extracted image is set as the comparative image 102" (FIG. 22) used for comparison with the reference image (characteristic region 102'). The control portion 61 compares the reference image (the characteristic region 102') and the comparative image 102" each time when the observation object 2 is photographed and a comparative observation image 101*b* is generated successively. If the reference image (the characteristic region 102') is displaced, the comparative image 102" differs from the reference image (the characteristic region 102').

At step S52, the control portion 61 determines whether the difference between the reference image (the characteristic region 102') and the comparative image 102" is greater than or equal to the threshold. The threshold is set to a value that reduces that likelihood that insignificant displacement such as a slight displacement of soil on the ground surface caused by weather is detected as displacement of the comparative image 102" with respect to the reference image (the characteristic region 102'). If the difference between the reference image (the characteristic region 102') and the comparative image 102" is greater than or equal to the threshold and thus displacement is detected between the reference image and the comparative image, the control portion 61 proceeds to the next process. If no displacement is detected, the control portion 61 ends the process.

Figure 22:
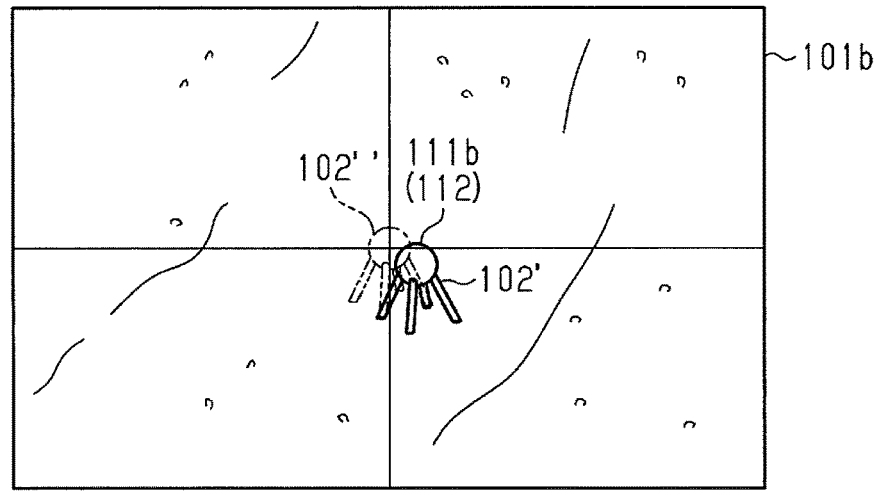
FIG. 22 is a diagram showing a comparative observation image in which the characteristic region is displaced from the center of the angle of view in a certain direction in the third monitoring method.

Further, as shown in FIG. 22, the control portion 61 extracts the displaced characteristic region 102' in the comparative observation image 101*b* by detecting the outline of the target 102 through image recognition. In one example, the control portion 61 calculates the centroid of the characteristic region 102' in the comparative observation image 101*b*, sets this centroid as the representative position, sights the survey instrument 20 again on this representative position so that the representative position is at the center of the angle of view, and observes the representative position (measures the distance and angle). The post-displacement observation data of the representative position is stored in the storage device 14 or other storage. This allows comparison between the position of the characteristic region 102' that serves as the reference image and the characteristic region 102' in the comparative observation image 101*b*. In one example, the characteristic region 102' extracted from the reference observation image 101*a* and the characteristic region 102' extracted from the comparative observation image 101*b* can be displayed in one of the reference observation image 101*a* and the comparative observation image 101*b*. Further, obtaining the difference between the reference position information and the post-displacement position information enables determination on the direction and the extent of the displacement of the characteristic region 102'. In one example, obtaining the difference between the reference position coordinate data and the post-displacement position coordinate data enables determination on the direction and the extent of the displacement of the characteristic region 102'.

Then, at step S53, to identify the state of the surrounding area of observation object 2*a*, which surrounds the observation object 2 in the center, the control portion 61 photographs the surrounding area of observation object 2*a* around the current observation object 2 with the survey instrument 20 so as to photograph an area that is larger than the observation object 2.

When displacement is detected, at step S54, the control portion 61 resets the reference image. That is, the control portion 61 calculates the centroid of the characteristic region 102' extracted from the comparative observation image 101*b*, sets this centroid as the representative position, sights the survey instrument 20 again on this representative position so that the representative position is at the center of the angle of view, and observes the representative position (measures the distance and angle). The control portion 61 controls the photographic portion 27 to capture an observation image 101 and stores the image data generated by photographing in the storage device 14 or other storage together with the observation data of the representative position. The new reference observation image 101*a* after displacement detection is thus obtained, and the control portion 61 repeats the monitoring process from step S48. That is, monitoring is performed using the state after the displacement as the reference observation image 101*a*. This prevents the situation where further displacement results in the characteristic region 102' being outside the initial comparative observation image 101*b*, that is, being impossible to photograph.

In one example, when displacement is detected, the intervals of monitoring are changed from 5 minutes to 3 minutes or 1 minute. In one example, if displacement is not detected for a predetermined duration or longer, the observation intervals are increased from 5 minutes to 10 minutes, for example.

At step S55, the control portion 61 generates an e-mail for notifying operators about the displacement and sends the e-mail to the e-mail addresses registered in the address book of the e-mail program 64*b*. Other means of notifying operators or others include notification through an electric bulletin board and post-sharing services, such as an electronic bulletin board system and an SNS.

[Fourth Monitoring Method]

The fourth monitoring method superimposes and displays terrain model data, which may be square mesh data (FIG. 24) or Tin data (FIG. 25), over an observation image 101 captured with the survey instrument 20.

Figure 23:
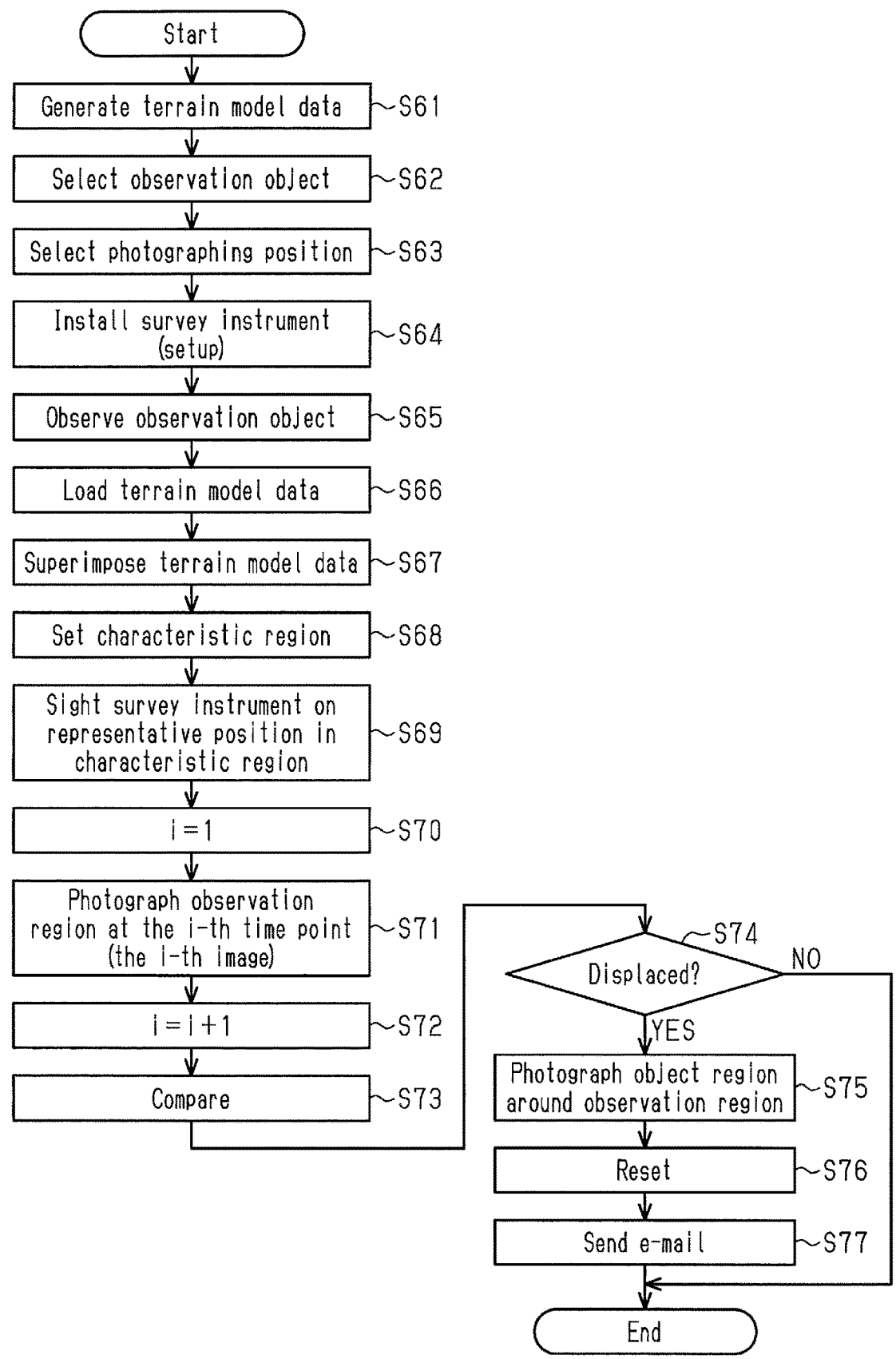
FIG. 23 is a flowchart showing the sequence of a fourth monitoring method.

Referring to FIG. 23, the process sequence of the fourth monitoring method is now described. At step S61, terrain model data is generated. In the same manner as the first to third monitoring methods, the wide-area observation object 12 is photographed with the camera of the flying object 11 to generate image data for photogrammetry. An orientation process is performed on the image data to generate terrain model data. Alternatively, the fourth monitoring method generates terrain model data by directly measuring the wide-area observation object 12 with the three-dimensional measurement device 15. The terrain model data may also be generated by other methods.

At step S62, one or more observation objects 2 may be selected referring to the obtained aerial photographs or the terrain model data, and the positions of the observation objects 2 are specified in the coordinates. At step S63, one or more photographing positions 3 for installing a survey instrument 20, which is used to photograph the observation objects 2, are selected. After a photographing position 3 is selected, at step S64, a survey instrument 20 is delivered to and installed at the photographing position 3 and set up.

At step S65, the observation controller 60 controls the survey instrument 20 to photograph the observation object 2 and observe (measure the distance and angle) the observation point indicated by the reticle. Specifically, this observation obtains observation data of the representative observation point in the observation object 2 indicated by the reticle. The observation data includes distance measurement data, angle measurement data, and observation position information (e.g., observation coordinate data). The observation controller 60 stores the data obtained by the survey instrument 20 in the storage device 14 or other storage.

Figure 24:
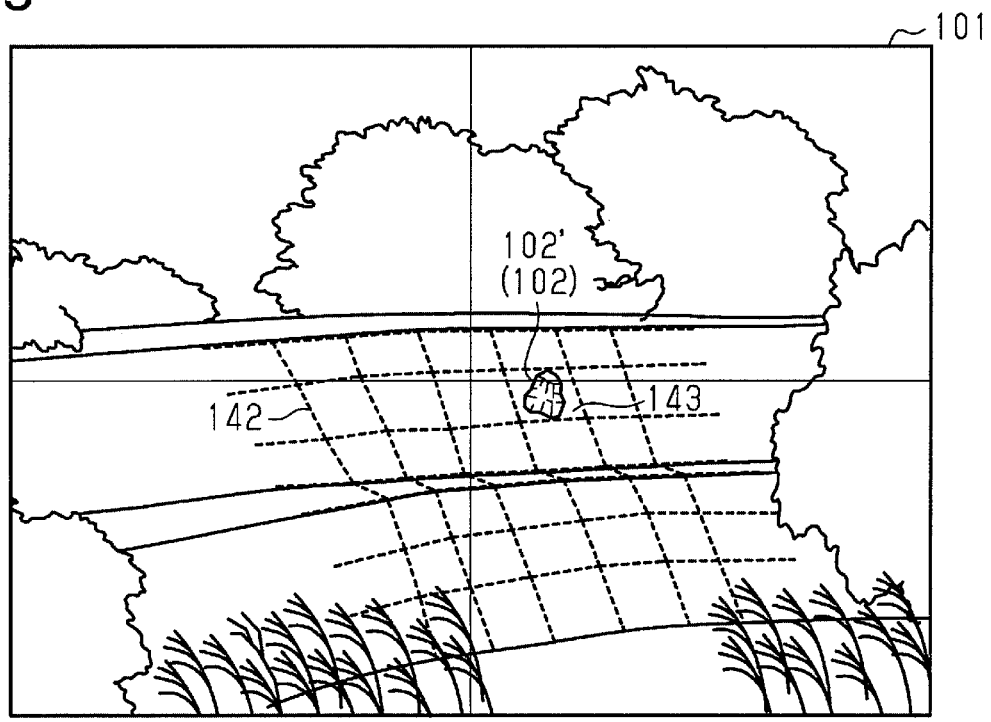
FIG. 24 is a diagram showing a state in which square mesh data is superimposed over an observation image captured with the photographic portion of the survey instrument in the fourth monitoring method.
Figure 25:
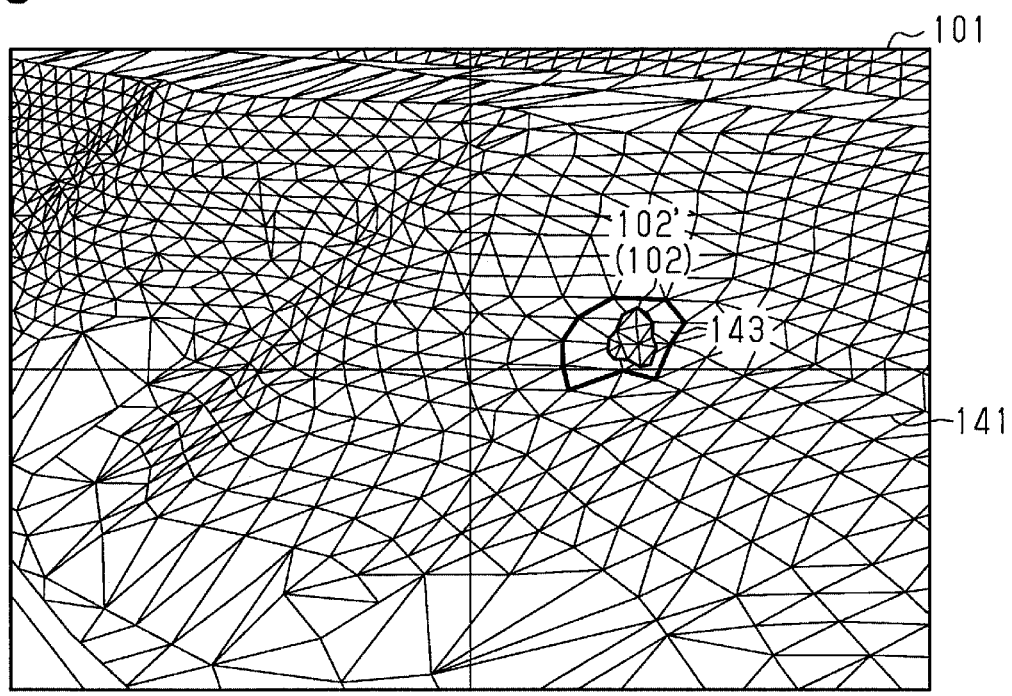
FIG. 25 is a diagram showing a state in which Tin data is superimposed over an observation image captured with the photographic portion of the survey instrument in the fourth monitoring method.

At step S66, the control portion 61 of the observation controller 60 loads the terrain model data into the storage portion 64 or other storage. Alternatively, the terrain model data may be loaded into the temporary storage portion 54 or the storage portion 55 of the survey instrument 20. The terrain model data loaded in this step is generated at step S61. The terrain model data may be generated by other means. At step S67, the control portion 61 sights the survey instrument 20 on the position indicated by the observation position information, which is obtained at step S25 and stored in the storage device 14. The survey instrument 20 photographs the observation object 2, on which the survey instrument 20 is sighted. As shown in FIGS. 24 and 25, the captured observation image 101 is displayed on the display portion 62. On the display portion 62 of the observation controller 60, the control portion 61 superimposes square mesh data 142 or Tin data 141 over the observation image 101 captured with the photographic portion 27 of the survey instrument 20.

FIG. 24 shows a state in which square mesh data 142 is superimposed over an observation image 101 captured with the photographic portion 27 of the survey instrument 20. FIG. 25 shows a state in which Tin data 141 is superimposed over the observation image 101 captured with the photographic portion 27 of the survey instrument 20. In each of FIGS. 24 and 25, the rock is the target 102 in the observation object 2 and also the characteristic region 102' in the observation image 101. In the square mesh data 142, the vertices of the rectangular grids each have three-dimensional coordinate data. In the Tin data 141, the vertices of the triangular grids each have three-dimensional coordinate data.

Figure 26:
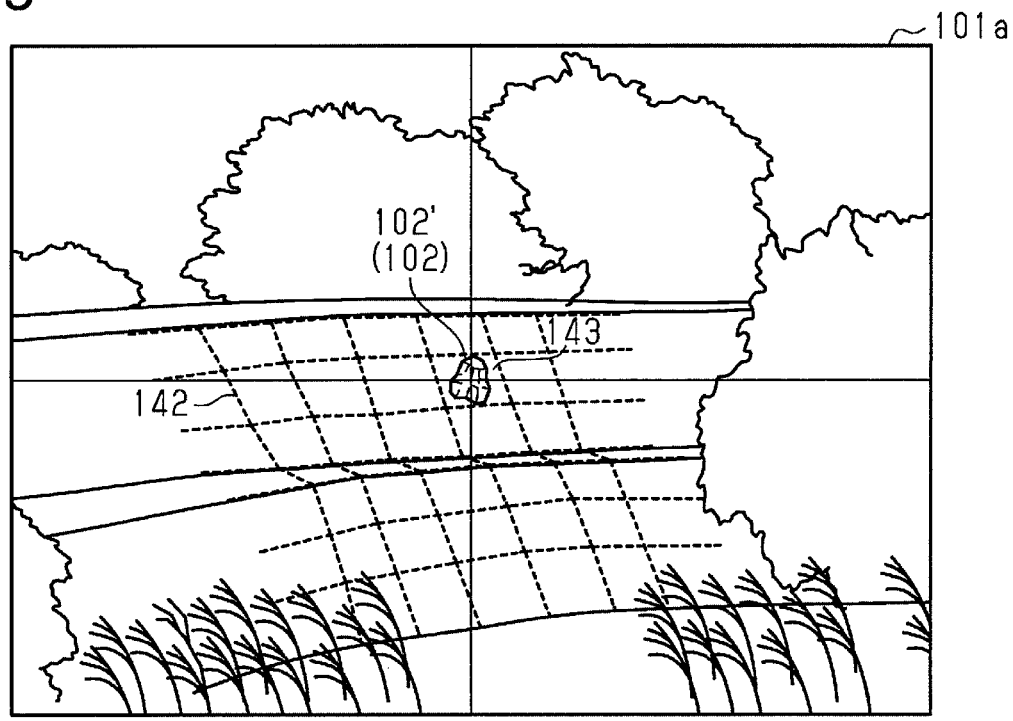
FIG. 26 is a diagram showing a reference observation image, which has a characteristic region at the center of the angle of view and on which square mesh data is superimposed in the fourth monitoring method.
Figure 27:
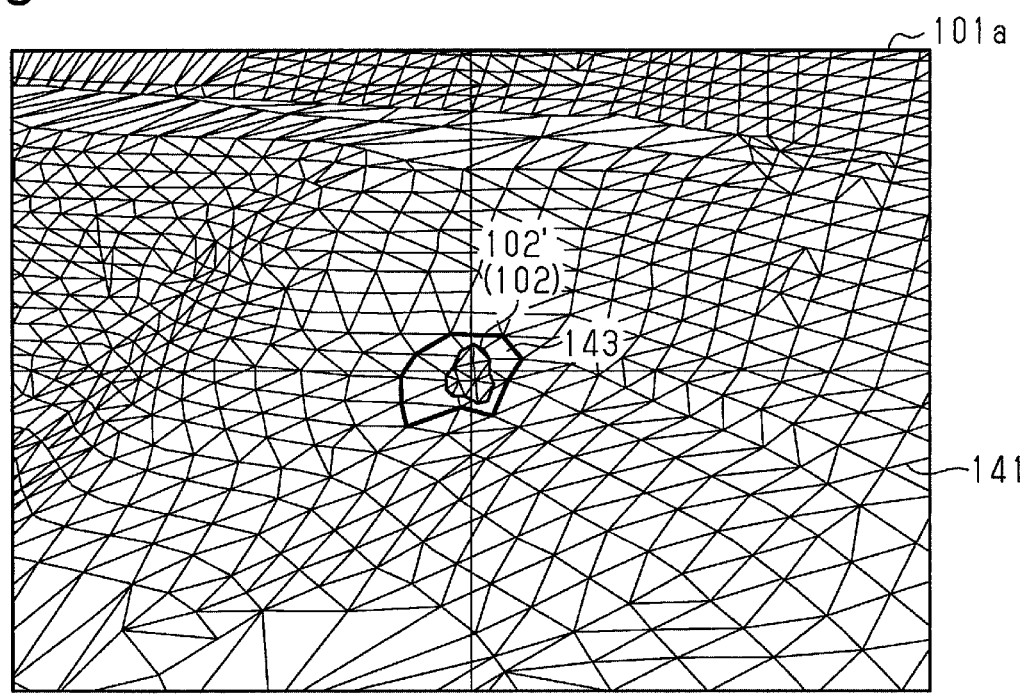
FIG. 27 is a diagram showing a reference observation image, which has a characteristic region at the center of the angle of view and on which Tin data is superimposed in the fourth monitoring method.

At step S68, the characteristic region 102' is specified using the operation portion 63, such as the mouse. The control portion 61 extracts the characteristic region 102' from the observation image 101 by detecting the outline of the target 102 through image recognition. In one example, at step S69, the control portion 61 calculates the centroid of the characteristic region 102', sets this centroid as the representative position, sights the survey instrument 20 again on this representative position so that the representative position is at the center of the angle of view, and observes the representative position (measures the distance and angle). As shown in FIGS. 26 and 27, the photographic portion 27 thus obtains a reference observation image 101*a*. The image data of the reference observation image 101*a* is stored in the storage device 14 or other storage together with the reference observation data of this representative position. Accordingly, the reference observation image 101*a* has the centroid of the characteristic region 102' in the center of the angle of view. Then, one or more grid regions 143 surrounding the characteristic region 102' in the reference observation image 101*a* are used as the reference image. The characteristic region 102' is at the center of the angle of view of the reference observation image 101*a*. As such, even if displacement occurs and moves the position of the characteristic region 102' in a certain direction, the characteristic region 102' will still be present at a certain position within the angle of view.

FIG. 26 shows an example that uses square mesh data 142 and in which the characteristic region 102' is at the center of the angle of view. FIG. 27 shows an example that uses Tin data 141 and in which the characteristic region 102' is at the center of the angle of view.

When it is impossible to observe the representative position with the survey instrument 20, the coordinate data of the terrain model data is used.

When storing the image data of the reference observation image 101a and the reference observation data in the storage device 14 or other storage, the control portion 61 obtains accurate time information, various data of the observation conditions, and weather information data from external devices, and stores the information in the storage device 14 or other storage.

At step S70, the control portion 61 starts monitoring the observation object 2. Specifically, the control portion 61 sets i=1 so that the observation object 2 is photographed at the initial first time point. At step S71, the control portion 61 performs, at the first time point, sighting and observation (measurement of distance and angle) on the position indicated by the reference position information, photographs the observation object 2, and stores the image data of the first comparative observation image and the comparative observation data in the storage device 14 or other storage. At step S72, the control portion 61 adds "1" to "i" and repeats the process from step S71. That is, the fourth monitoring method monitors characteristic region 102' and detects displacement of the characteristic region 102' in the reference observation image 101a by comparing the characteristic region 102' with the grid region 143.

In one example, when storing the image data of the i-th comparative observation image and the comparative observation data in the storage device 14 or other storage, the control portion 61 obtains accurate time information, various data of the observation conditions, and weather information data from external devices as described above, and stores the information in the storage device 14 or other storage.

When one survey instrument 20 monitors a plurality of observation objects 2, between the i-th time point and the (i+1)th time point, the survey instrument 20 rotates the photographic portion 27 about the vertical axis and the horizontal axis so that the position indicated by the reference position information for the next observation object 2 is sighted and photographed.

The displacement detection of the characteristic region 102' is now described. The control portion 61 extracts from the i-th comparative observation image 101b, which is captured during monitoring, an image of the grid region 143 that is at the same place as the grid region 143 set at step S69 through image recognition. The extracted image is set as the comparative image used for comparison with the reference image. At step S73, the control portion 61 compares the reference image and the comparative image each time when the observation object 2 is photographed and a comparative observation image 101b is generated successively. At step S74, the control portion 61 determines whether the difference between the reference image and the comparative image is greater than or equal to the threshold. If the difference between the reference image and the comparative image is greater than or equal to the threshold and thus displacement is detected between the reference image and the comparative image, the control portion 61 proceeds to the next process. If no displacement is detected, the control portion 61 ends the process.

Figure 28:
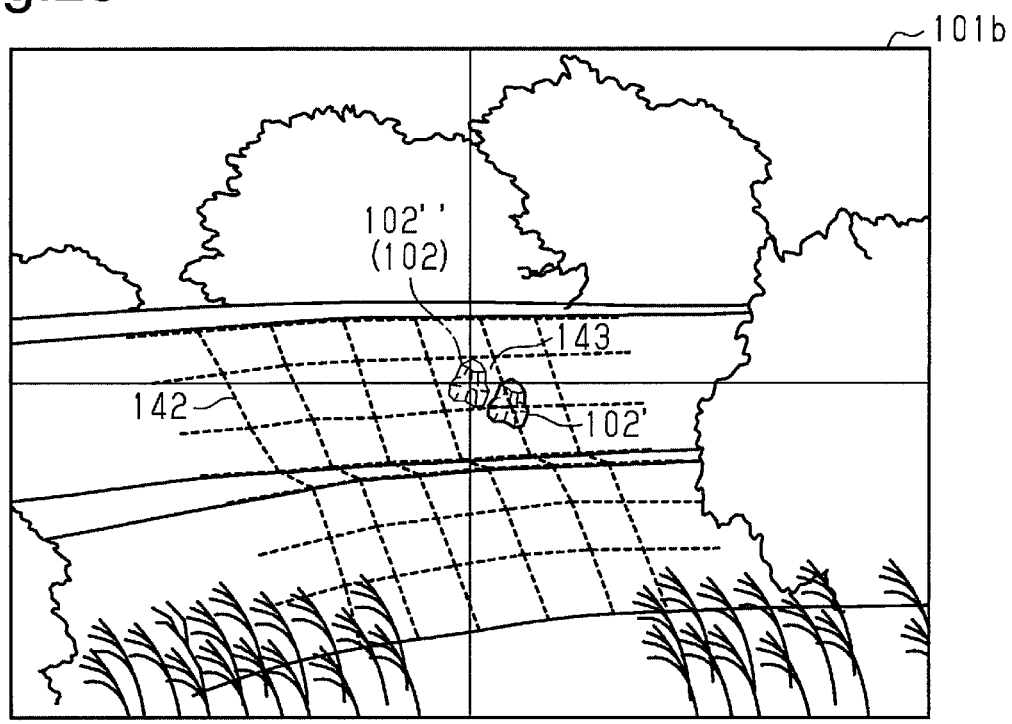
FIG. 28 is a diagram showing a comparative observation image in which the characteristic region is displaced from the center of the angle of view in a certain direction and on which square mesh data is superimposed in the fourth monitoring method.
Figure 29:
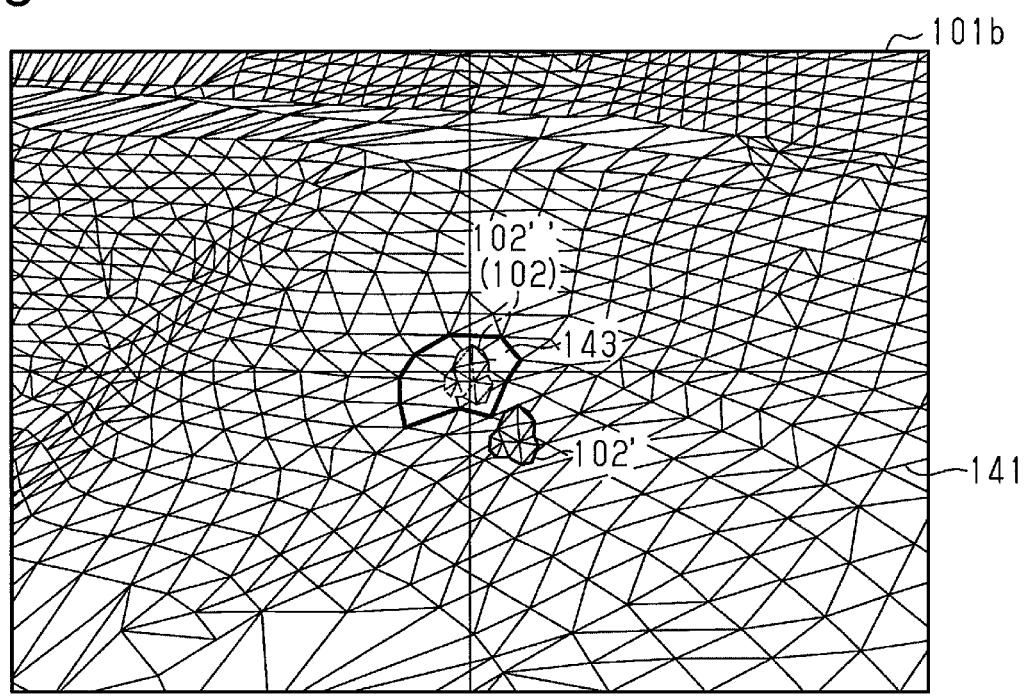
FIG. 29 is a diagram showing a comparative observation image in which the characteristic region is displaced from the center of the angle of view in a certain direction and on which Tin data is superimposed in the fourth monitoring method.

FIG. 28 shows an example that uses square mesh data 142 and in which the characteristic region 102' is displaced from the center of the angle of view. FIG. 29 shows an example that uses Tin data 141 and in which the characteristic region 102' is displaced from the center of the angle of view.

When the square mesh data 142 or the Tin data 141 is superimposed and displayed on the display portion 62, it is possible to determine whether the characteristic region 102' is displaced in the i-th comparative observation image by identifying how far the characteristic region 102' deviates from the grid region 143, which serves as the reference image, based on the distance between the characteristic region 102' and a side or a grid point of the reference grid, for example.

In addition, the control portion 61 extracts the characteristic region 102' in the comparative observation image 101b. The control portion 61 calculates the centroid of the characteristic region 102', sets this centroid as the representative position, sights the survey instrument 20 again on this representative position so that the representative position is at the center of the angle of view, and observes the representative position (measures the distance and angle). The post-displacement observation data of this representative position is stored in the storage device 14 or other storage. This allows comparison between the position of the characteristic region 102' that serves as the reference image and the characteristic region 102' in the comparative observation image 101b. In one example, the characteristic region 102' extracted from the reference observation image 101a and the characteristic region 102' extracted from the comparative observation image 101b can be displayed in one of the reference observation image 101a and the comparative observation image 101b. Further, obtaining the difference between the reference position information and the post-displacement position information enables determination on the direction and the extent of the displacement of the characteristic region 102'. In one example, obtaining the difference between the reference position coordinate data and the post-displacement position coordinate data enables determination on the direction and the extent of the displacement of the characteristic region 102'.

Then, at step S75, to identify the state of the surrounding area of observation object 2a, which surrounds the observation object 2 in the center, the control portion 61 photographs the surrounding area of observation object 2a around the current observation object 2 with the survey instrument 20 so as to photograph an area that is larger than the observation object 2.

At step S76, the control portion 61 resets the reference image (see step S34). That is, the control portion 61 calculates the centroid of the characteristic region 102' extracted from the comparative observation image 101b, sets this centroid as the representative position, sights the survey instrument 20 again on this representative position so that the representative position is at the center of the angle of view, and observes the representative position (measures the distance and angle). Then, the observation data of this representative position is stored in the storage device 14 or other storage together with the image data of the observation image 101 captured with the photographic portion 27. The new reference observation image 101a after displacement detection is thus obtained, and the control portion 61 repeats the monitoring process from step S70. That is, monitoring is performed using the state after the displacement as the reference observation image 101a. This prevents the situation where further displacement results in the characteristic region 102' being outside the initial comparative observation image 101b, that is, being impossible to photograph.

In one example, when displacement is detected, the intervals of monitoring are changed from 5 minutes to 3 minutes or 1 minute. In one example, if displacement is not detected for a predetermined duration or longer, the observation intervals are increased from 5 minutes to 10 minutes, for example.

At step S77, the control portion 61 may generate an e-mail for notifying operators about the displacement and send the e-mail to the e-mail addresses registered in the address book of the e-mail program 64b. Other means of notifying operators or others include notification through an electric bulletin board and post-sharing services, such as an electronic bulletin board system and an SNS.

[Display of Displacement of Characteristic Region]

Figure 30:
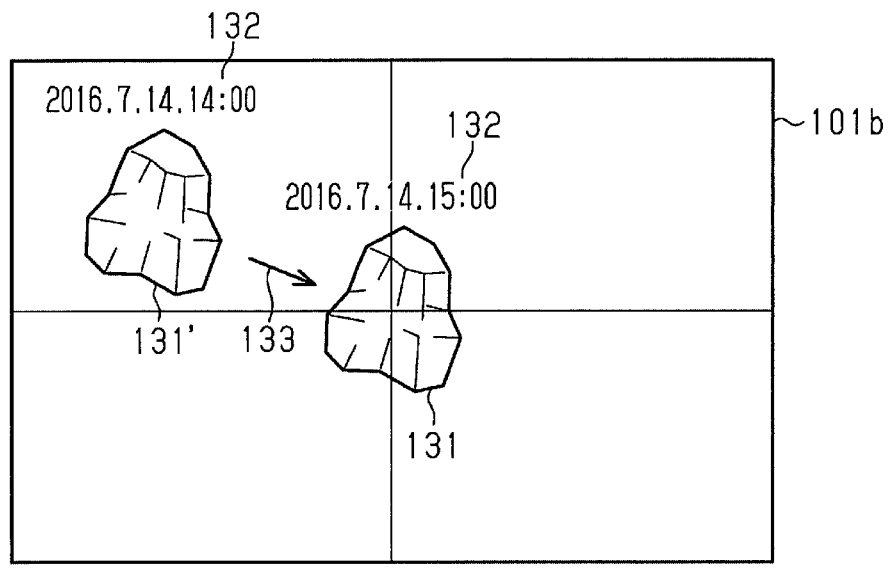
FIG. 30 is a diagram showing an image in which a characteristic region in a reference observation image is superimposed over a comparative observation image.

In the first to fourth monitoring methods described above, the control portion 61 of the observation controller 60 stores the reference observation data of the reference observation image 101a, the comparative observation data of the comparative observation image 101b, and the post-displacement observation data of the characteristic region in the storage device 14 or other storage. This allows the control portion 61 to identify the position of the characteristic region in the reference observation image 101a and the position of the characteristic region in the comparative observation image 101b. Accordingly, as shown in FIG. 30, when detecting displacement of the characteristic region 131, the control portion 61 may superimpose and display the characteristic region 131' in the reference observation image 101a before displacement over the comparative observation image 101b after displacement. Alternatively, the characteristic region 131 in the comparative observation image 101b after displacement may be superimposed and displayed over the reference observation image 101a before displacement. As a result, the characteristic region 131' before displacement and the characteristic region 131 after displacement are displayed in one observation image. That is, when the target 102 is displaced between the first time point and the second time point, the display portion 62 displays an object indicating the first time point and an object indicating the position of the target 102 at the first time point in relation to each other, and displays an object indicating the second time point and an object indicating the position of the target 102 at the second time point in relation to each other. This allows the viewer to visually recognize the direction and the extent of the displacement of the characteristic region 131 that occurred between the two time points. In one example, a time object 132 indicating the time point at which the image is captured may be displayed near each of the characteristic regions 131 and 131'. In addition, a displacement direction object 133, which is an arrow indicating the direction of the displacement, may be displayed. Further, the speed of the displacement may be indicated by varying the size of the arrow of the displacement direction object 133. In one example, a larger arrow indicates a higher displacement speed. In addition, an object that indicates the observation conditions or weather information may be superimposed and displayed. Instead of the characteristic region 131, any other objects may be displayed that enable visual recognition of the direction and the extent of the displacement of the characteristic region 131.

Figure 31:
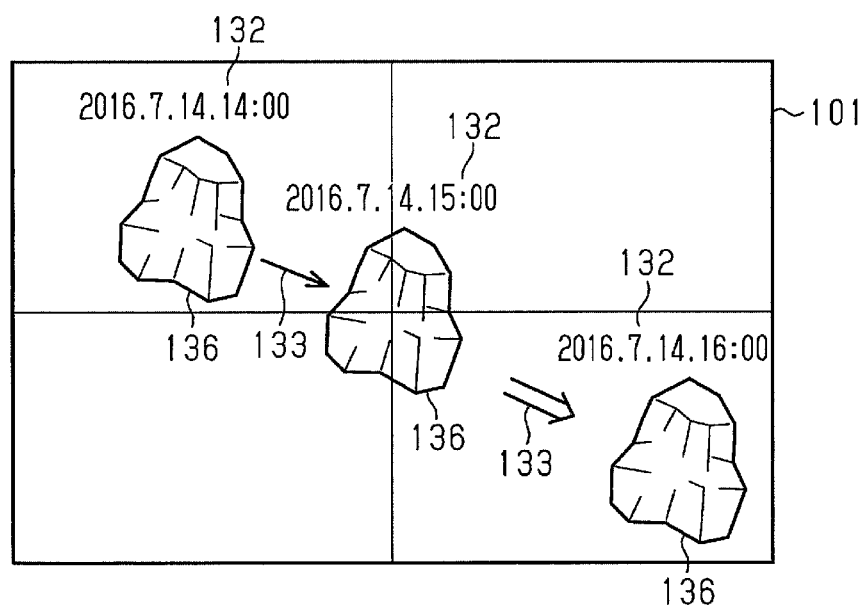
FIG. 31 is a diagram showing an image displaying the progress of displacement of a characteristic region.

As shown in FIG. 31, displacement of a characteristic region 136 may be checked after the monitoring, for example when the displacement is studied, instead of during the monitoring. In one example, the observation controller 60 searches for a particular observation object 2 and extracts the images of this observation object 2 captured at different time points. The search result screen displays the reference image, allowing visual identification of the search results. Then, based on the observation data of the characteristic regions 131 in the reference observation images 101a and the comparative observation images 101b captured at different time points, the characteristic regions 136 at different time points may be displayed in one observation image 101, enabling visual identification of the history of the displacement. In the example of FIG. 31, the displacement history of the characteristic regions 136 captured at three time points is displayed. This allows the viewer to visually recognize the direction and the extent of the displacement of the characteristic region 136 that occurred between the first and last time points. In one example, a time object 132 indicating the time point at which the image is captured may be displayed near each of the characteristic regions 136. In addition, a displacement direction object 133, which is an arrow indicating the direction of the displacement, may be displayed. In addition, the speed of the displacement may be indicated by varying the size of the arrow of the displacement direction object 133. In one example, a larger arrow indicates a higher displacement speed. In addition, an object that indicates the observation conditions or weather information may be superimposed and displayed. Instead of the characteristic region 131, any other objects may be displayed that enable visual recognition of the direction and the extent of the displacement of the characteristic region 131.

The number of the characteristic region 136 displayed in one observation image is not limited to three and may be four or more.

[Displacement Detection with GNSS Receiver]

As shown in FIG. 1, GNSS receivers 16 are installed at locations other than the observation objects 2. As shown in FIG. 32, at step S81, the control portion 61 of the observation controller 60 receives with the communication portion 65 the position information of the GNSS receivers 16 from the GNSS receivers 16 via the network 17 and stores the information in the storage device 14 or other storage. At step S82, for each of the GNSS receivers 16, the control portion 61 determines whether the position information of the current time point is different from the position information of the previous time point. At step S83, when detecting a change in the position information, the control portion 61 shortens the photographing intervals of the survey instrument 20 in the monitoring. When detecting no change in the position information, the control portion 61 continues the normal monitoring without changing the photographing intervals, for example.

In one example, until a change in the position information of a GNSS receiver 16 is detected, the observation object 2 is photographed at intervals of 5 minutes (the first intervals). When a change in the position information is detected, the control portion 61 changes the intervals at which the observation object 2 is photographed to 3 minutes or 1 minute (the second intervals). When the position information of a GNSS receiver 16, which is positioned separately from the observation object 2, is changed, this may be understood as a sign of potential displacement of the observation object 2. Thus, when detecting a change in the position information of the GNSS receiver 16, the control portion 61 shortens the intervals at which the observation object 2 is photographed during monitoring from the first intervals to the second intervals, allowing for more precise detection of changes in the characteristic region.

In one example, when a plurality of observation objects 2 is observed and displacement is detected in one or more of the observation objects 2, the survey instrument 20 may give priority to the displaced observation objects 2 over the others. In one example, the observation object 2 in which displacement is detected is observed at shorter intervals than the observation object 2 in which no displacement is detected. When displacement is detected in more than one observation object 2, the survey instrument 20 observes these observation objects 20 at shorter photographing intervals in the order of amount of detected displacement, from largest to smallest. When the position of a GNSS receiver 16 placed in the wide-area observation object 12 under observation is displaced, the observation objects 2 are observed at shorter photographing intervals in the order of closest to farthest from the displaced GNSS receiver 16. In one example, when observation objects 2 have different amounts of displacement, an observation object 2 with greater displacement is photographed at shorter photographing intervals.

The above-described observation controller 60 has the following advantages.

(1) The comparison between the characteristic region in the reference observation image 101a and the comparative image in the comparative observation image 101b, which corresponds to the characteristic region in the reference observation image, achieves detection of displacement of the comparative image with respect to the characteristic region in the reference observation image 101a. This enables fast, accurate detection of displacement of the characteristic region.

(2) The first monitoring method specifies a distinctive area as a closed region in the observation image, achieving the selection of a characteristic region without actually going to the observation object 2.

(3) The second monitoring method applies the observation paint 111a to the observation object 2 using the flying object 11, achieving the setting of the characteristic region without actually going to the observation object.

(4) The third monitoring method sets the observation target 111b in the observation object 2 using the flying object 11, achieving the setting of the characteristic region without actually going to the observation object 2.

(5) The fourth monitoring method superimposes the terrain model data over the displayed observation object, enabling visual identification of displacement with respect to the terrain model data. In addition, if the representative position cannot be observed with the survey instrument 20, the representative position may be specified in the coordinate data of the terrain model data.

(6) The wide-area observation object 12 is photographed with the camera of the flying object 11 in flight to generate image data for photogrammetry. An orientation process is performed on the image data to generate terrain model data. The terrain model data is generated in accordance with a coordinate system such as global coordinates or local coordinates, so that the observation object 2 and the photographing position 3 may be specified in the coordinate system. The flying object 11 is guided according to the coordinate data of the observation object 2 and the photographing position 3. Guiding the flying object 11 to the observation object 2 specified in the coordinate data achieves the setting of the characteristic region 102' with the observation paint 111a or the observation target 111b.

(7) Observation objects 2 may be set at a plurality of locations in the wide-area observation object 12. As such, a plurality of locations in the wide-area observation object 12 can be observed for displacement.

(8) The observation object 2 is photographed at different time points. A comparative observation image 101b captured at each time point is compared with the reference observation image 101a.

(9) The survey instrument 20 is used as the photographic device, enabling accurate observation of the photographing position. In addition, the survey instrument 20 enables fast detection of displacement as compared with other devices, such as the three-dimensional measurement device 15.

(10) Characteristic regions captured at different time points may be superimposed and displayed over one observation image, facilitating visual recognition of the progress of displacement of the characteristic region. In addition, displaying a time object 132 or a displacement direction object 133 further improves the presentation of displacement of the characteristic region.

(11) GNSS receivers 16 are used to observe displacement in the wide-area observation object 12. Displacement detected with a GNSS receiver 16 may be understood as a sign of potential displacement of an observation object 2, and thus the photographing intervals during monitoring are shortened. Consequently, when displacement occurs, the progress of the displacement is observed in detail.

(12) Detection of displacement may be output so as to notify operators about the displacement.

(13) Obtaining time information from an external device increases the accuracy of photographing timing.

(14) Obtaining the observation conditions from an external device enables recognition of the observation conditions under which the images are captured. This enables identification of the relationship between the observation conditions and displacement when it occurs.

(15) Obtaining the weather information from an external device provides the information on the weather at the time the images are captured. This enables identification of the relationship between the weather and the cause of displacement when it occurs.

The above-described observation system 1 may be modified as follows.

The observation controller 60 does not have to obtain weather information each time the observation object 2 is photographed. For example, weather information may be obtained at fixed time in a day, such as once a day or twice a day. The observation controller 60 does not have to be connected to the weather server 18 if weather information is obtainable by other means.

The observation controller 60 does not have to obtain data on the observation conditions each time the observation object 2 is photographed. If the observation conditions are obtainable by other means, the observation hut 4 does not have to include the temperature measuring device 6, the humidity measuring device 7, or the barometric pressure measuring device 8.

Instead of a GNSS or NTP server, the current time may be obtained from a clock embedded in the survey instrument 20 or the observation controller 60.

The method of outputting detection of displacement to people concerned, that is, notifying them about the displacement, is not limited to e-mail. For example, emergency news may be broadcast on television or radio. Further, the means of notifying people concerned about displacement may be omitted when the monitoring is not designed to detect large displacement.

When a large number of survey instruments 20 are installed to observe a large number of observation objects 2, detection of displacement with the GNSS may be omitted.

For clear presentation, the time object 132 or the displacement direction object 133 may be omitted when the display screen is small, for example.

At least one comparative observation image 101b may be compared with the reference observation image 101a.

When a small area is observed, the observation object 2 may be a single location.

The observation controller 60 does not have to include all of the functions for the first to fourth monitoring methods. For example, the function of superimposing terrain model data may be omitted. In addition, the function of observing using the observation target 111b or the observation paint 111a may be omitted. Furthermore, the function of specifying a closed region in the reference observation image 101a may be omitted.

The square mesh data or the Tin data superimposed over the observation image in the fourth monitoring method may be superimposed over the observation images in the first to third monitoring methods. This facilitates visual perception of displacement of the characteristic region.

The observation object 2 may be photographed at time points other than those programmed for monitoring. In this case, the observation with the survey instrument 20 is still controlled remotely by the observation controller 60. In addition, the observation of the observation object 2 may be performed by sending an operator to the photographing position 3.

Instead of using the flying object 11, the observation paint 111a or the observation target 111b may be set by a robot that runs on the ground. This still achieves a similar advantage as when the flying object 11 is used. Alternatively, an operator may go to the site for installation.

As the photographic device, a digital camera, such as a single lens reflex camera or a compact camera, may be used. As the photographic device, an infrared camera or a thermal camera may be used in place of the survey instrument 20, or as the photographic portion of the survey instrument 20. Infrared cameras are capable of capturing images in fog or rain. Thermal cameras enable a prediction about the likelihood of landslide based on the permeation/water content of soil. Further, the images captured with the photographic device may be color images or monochrome images.

To detect displacement, the obtainment of the comparative observation data of the characteristic region in the comparative observation image, and the extraction of the characteristic region in the comparative observation image through image recognition do not have to be performed as long as it is possible to detect that the characteristic region in the reference observation image is displaced in the comparative observation image.

In monitoring, an observation image captured at the first time point may be used as the reference observation image, and an observation image captured at the second time point, which is subsequent to the first time point, may be used as a comparative observation image. That is, the reference observation image does not have to be an observation image captured before starting monitoring. In monitoring, the observation image that is captured immediately prior to the current image may be used as the reference observation image, so that the observation image captured immediately prior to the current image is used for each comparison.

The power of the survey instrument 20 may be controlled by the observation controller 60. In one example, during monitoring, a power saving mode may be used to reduce power consumption. The power saving mode includes a standby mode in which only the minimum circuits are activated when images are not captured. In addition, a power saving mode may be used for the power source at night. Such power management is especially beneficial when the power unit 10 is a rechargeable battery, for example.

The survey instrument 20 does not have to be sighted on the characteristic region to observe the characteristic region. For example, the angle of the observation point indicated by the center of the reticle in the image area is calculated, and coordinate values in the global coordinate of the pixels of the captured observation image are calculated by converting the angle from the observation point O at the observation center. Thus, it is possible to obtain the reference position information and the post-displacement position information of the characteristic region extracted through image recognition without sighting the survey instrument 20 on the characteristic region extracted through image recognition.

The observation object may be selected to detect displacement of a structure, such as a dam or a tunnel wall, or a terrain displacement other than a landslide, such as ground subsidence.

DESCRIPTION OF THE REFERENCE NUMERALS

O1 . . . Vertical Axis; O2 . . . Horizontal Axis; O3 . . . Collimation Axis; 1 . . . Observation System; 2 . . . Observation Object; 2a . . . Surroundings of Observation Object; 2b . . . Surrounding image region; 3 . . . Photographing Position; 4 . . . Observation Hut; 5 . . . Communication Device; 6 . . . Temperature Measuring Device; 7 . . . Humidity Measuring Device; 8 . . . Barometric Pressure Measuring Device; 9 . . . Work Hut; 10 . . . Power Unit; 11 . . . Flying Object; 11a . . . Camera; 11b . . . Holding Portion; 12 . . . Wide-Area Observation Object; 14 . . . Storage Device; 15 . . . three-Dimensional Measurement Device; 16 . . . GNSS Receiver; 17 . . . Network; 18 . . . Weather Server; 20 . . . Survey Instrument; 22 . . . Leveling Portion; 23 . . . Base Plate; 24 . . . Upper Plate; 25 . . . Leveling Screw; 26 . . . Main Body; 27 . . . Photographic Portion; 28 . . . First Objective Lens; 29 . . . Second Objective Lens; 30 . . . Third Objective Lens; 31 . . . First Photographic Portion; 31a . . . Autofocus Portion; 32 . . . Second Photographic Portion; 33 . . . Distance Measuring Portion; 34 . . . Third Photographic Portion; 35 . . . Horizontal-Angle Driving Portion; 36 . . . Light Transmitting Portion; 37 . . . Vertical-Angle Driving Portion; 38 . . . First Display Portion; 39 . . . Second Display Portion; 40 . . . Communication Portion; 41 . . . Encoder for Horizontal-Angle Operation Portion; 42 . . . Encoder for Vertical-Angle Operation Portion; 43 . . . Horizontal-Angle Operation Portion; 44 . . . Vertical-Angle Operation Portion; 45 . . . Grip Portion; 51 . . . Horizontal-Angle Measuring Portion; 52 . . . Vertical-Angle Measuring Portion; 53 . . . Image Processing Portion; 54 . . . Temporary Storage Portion; 55 . . . Storage Portion; 56 . . . Operation Portion; 57 . . . Control Portion; 60 . . . Observation Controller; 61 . . . Control Portion; 61a . . . CPU; 61b . . . ROM; 61c . . . RAM; 62 . . . Display Portion; 63 . . . Operation Portion; 64 . . . Storage Portion; 64a . . . Observation Program; 64b . . . E-Mail Program; 65 . . . Communication Portion; 101 . . . Observation Image; 101a . . . Reference Observation Image; 101b . . . Comparative Observation Image; 102 . . . Target; 102' . . . Characteristic Region; 103 . . . Specified Region; 103' . . . Comparative Specified Region; 111 . . . Holder; 111a . . . Observation Paint; 111b . . . Observation Prism; 112 . . . Target Portion; 113 . . . Leg; 121 . . . Characteristic Region; 131 . . .

Characteristic Region; 132 . . . Time Object; 133 . . . Displacement Direction Object; 141 . . . Tin Data; 142 . . . Square Mesh Data

The invention claimed is:

1. A monitoring method comprising:
   placing a target using terrain model data;
   generating first image data by photographing the target with a photographic portion of a survey instrument at a first time point;
   generating second image data by photographing the target with the photographic portion of the survey instrument at a second time point, which is subsequent to the first time point; and
   detecting displacement of the target using a first image, which is based on the first image data, and a second image, which is based on the second image data;
   in response to detecting the displacement of the target, generating third image data by photographing the target with the photographic portion of the survey instrument at a third time point, which is subsequent to the second time point, wherein an interval between the second time point and the third time point is shorter than an interval between the first time point and the second time point; and
   detecting displacement of the target using the second image, which is based on the second image data, and a third image, which is based on the third image data.

2. The monitoring method according to claim 1, further comprising:
   selecting, using the terrain model data, a target position at which the target is to be placed; and
   wherein the placing step comprises placing the target at the target position with a flying object, which holds the target, by flying the flying object, wherein the flying object is a manned aircraft or an unmanned aerial vehicle.

3. The monitoring method according to claim 2, wherein:
   the target is paint, and
   the paint is applied to the target position by flying the flying object, which holds the paint.

4. The monitoring method according to claim 2, further comprising determining whether the target is placed at the target position using image data acquired by a photographic portion of the flying object.

5. The monitoring method according to claim 2, comprising determining whether the target is placed at the target position using image data acquired by the photographic portion of the survey instrument.

6. The monitoring method according to claim 5, further comprising, when it is determined that the target is failed to be placed at the target position, reattempting to place the target at the target position using the flying object.

7. The monitoring method according to claim 1, further comprising, when the target is displaced between the first time point and the second time point, simultaneously displaying both an object indicating a position of the target at the first time point and an object indicating a position of the target at the second time point on a display portion.

8. The monitoring method according to claim 7, further comprising, when the target is displaced between the first time point and the second time point, displaying an object indicating the first time point and the object indicating the position of the target at the first time point in relation to each other on the display portion, and displaying an object indicating the second time point and the object indicating the position of the target at the second time point in relation to each other on the display portion.

9. The monitoring method according to claim 7, further comprising, when the target is displaced between the first time point and the second time point, displaying an object indicating a direction in which the target is displaced from the position at the first time point to the position at the second time point on the display portion.

10. The monitoring method according to claim 7, further comprising superimposing and displaying the first image, which is based on the first image data generated by photographing the target with the photographic portion of the survey instrument, and an image based on the terrain model data on the display portion.

11. The monitoring method according to claim 1, further comprising:
    placing a GNSS receiver on the terrain;
    when the GNSS receiver is displaced, generating third image data by photographing the target with the photographic portion of the survey instrument at a third time point, which is subsequent to the second time point, wherein an interval between the second time point and the third time point is shorter than an interval between the first time point and the second time point; and
    detecting displacement of the target using the second image, which is based on the second image data, and a third image, which is based on the third image data.

12. The monitoring method according to claim 1, further comprising generating the terrain model data by flying a flying object, by photographing the terrain with a photographic portion of the flying object to generate image data for photogrammetry, and by performing orientation of the image data for photogrammetry.

13. The monitoring method according to claim 1, wherein the target is paint that is applied to a natural object.

14. The monitoring method according to claim 13, wherein the target is paint that is applied to a rock or a tree.

15. The monitoring method according to claim 1, wherein the target is an artificial item positioned using the flying object.

16. The monitoring method according to claim 15, wherein the target is observation paint that is applied to a region of the terrain or wherein the target is an observation target having a structure that can be recognized using the survey instrument.

17. The monitoring method according to claim 1, comprising generating the terrain model data by measuring the terrain with a three-dimensional measurement device.

18. A monitoring system comprising a controller, a flying object, and a survey instrument, wherein:
    the controller includes:
       a processor; and
       at least one memory comprising at least one nonvolatile memory, the at least one nonvolatile memory storing machine-readable instructions, the controller configured to execute the machine-readable instructions, and the machine-readable instructions comprising setting portion instructions and control portion instructions;
    the setting portion instructions configured so that, when executed by the controller, the setting portion instructions cause the controller to set a target position based on the terrain model data, and
    the control portion instructions configured so that, when executed by the controller, the control portion instructions cause the controller to instruct the flying object to place a target at the target position, which is set according to the setting portion instructions;

the flying object includes:
- at least one surface configured to hold the target, and
- at least one moving structure configured to move and thereby place the target, the at least one moving structure being held by the at least one surface, at the target position, the at least one moving structure being instructed according to the control portion instructions of the controller;

the survey instrument includes:
- a photographic portion configured to generate image data, and
- a photographic portion controller configured to control the photographic portion to generate first image data by photographing the target, which is placed at the target position, at a first time point and generate second image data by photographing the target at a second time point, which is subsequent to the first time point, and to send the first image data and the second image data to the controller; and the processor and the at least one memory of the controller are configured to detect displacement of the target between the first time point and the second time point using the first image data and the second image data sent from the survey instrument;

wherein the monitoring system is configured so that, in response to detecting the displacement of the target between the first time point and the second time point, the photographic portion controller of the survey instrument controls the photographic portion of the survey instrument to generate third image data by photographing the target with the photographic portion of the survey instrument at a third time point, which is subsequent to the second time point, wherein an interval between the second time point and the third time point is shorter than an interval between the first time point and the second time point; and wherein the monitoring system is configured to detect displacement of the target using a second image, which is based on the second image data, and a third image, which is based on the third image data.

19. A non-transitory computer-readable storage media comprising a program that, when executed by a computer, causes the computer to execute steps of:
- placing a target using terrain model data;
- generating first image data by photographing the target with a photographic portion of a survey instrument at a first time point;
- generating second image data by photographing the target with the photographic portion of the survey instrument at a second time point, which is subsequent to the first time point; and
- detecting displacement of the target using a first image, which is based on the first image data, and a second image, which is based on the second image data;
- in response to detecting the displacement of the target, generating third image data by photographing the target with the photographic portion of the survey instrument at a third time point, which is subsequent to the second time point, wherein an interval between the second time point and the third time point is shorter than an interval between the first time point and the second time point; and
- detecting displacement of the target using the second image, which is based on the second image data, and a third image, which is based on the third image data.

* * * * *